United States Patent
Levy et al.

(10) Patent No.: US 10,491,403 B2
(45) Date of Patent: Nov. 26, 2019

(54) DATA LOSS PREVENTION WITH KEY USAGE LIMIT ENFORCEMENT

(71) Applicant: Amazon Technologies, Inc., Seattle, WA (US)

(72) Inventors: Marcel Andrew Levy, Seattle, WA (US); Darren Ernest Canavor, Redmond, WA (US); Zachary Ganwise Fewtrell, Redmond, WA (US); Andrew Alphus Kimbrough, Seattle, WA (US); Jonathan Kozolchyk, Seattle, WA (US); Darin Keith McAdams, Seattle, WA (US); Pradeep Ramarao, Kirkland, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/881,550

(22) Filed: Jan. 26, 2018

(65) Prior Publication Data

US 2018/0167220 A1    Jun. 14, 2018

Related U.S. Application Data

(63) Continuation of application No. 14/318,422, filed on Jun. 27, 2014, now Pat. No. 9,882,720.

(51) Int. Cl.
*H04L 9/32*    (2006.01)

(52) U.S. Cl.
CPC ........ *H04L 9/3247* (2013.01); *H04L 2209/72* (2013.01)

(58) Field of Classification Search
CPC .. H04L 9/3247; H04L 2209/72; H05K 999/99
See application file for complete search history.

(56) References Cited

U.S. PATENT DOCUMENTS

| | | | |
|---|---|---|---|
| 5,295,188 A | 3/1994 | Wilson et al. | |
| 5,621,796 A | 4/1997 | Davis et al. | |
| 6,725,371 B1 | 4/2004 | Verhoorn, III et al. | |
| 7,983,423 B1 | 7/2011 | Agarwal et al. | |
| 8,417,954 B1 | 4/2013 | Sagal et al. | |

(Continued)

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Samson B Lemma
(74) *Attorney, Agent, or Firm* — Davis Wright Tremaine LLP

(57) ABSTRACT

In a distributed system, a computer system responsible, at least in part, for complying with a cryptographic key usage limit for a cryptographic key, obtains results of cryptographic operations generated based at least in part on the cryptographic key and transmits the obtained results over a network. The computer system digitally signs the results and provides the results with digital signatures of the results. Another device intercepts the results and allows the results to proceed to their destination contingent on successful validation of the digital signature.

20 Claims, 12 Drawing Sheets

(56) References Cited

U.S. PATENT DOCUMENTS

| | | | |
|---|---|---|---|
| 8,724,815 B1* | 5/2014 | Roth | H04L 63/062 380/270 |
| 2007/0208942 A1* | 9/2007 | May | H04L 63/062 713/171 |
| 2008/0320311 A1* | 12/2008 | Cho | H04L 9/3247 713/187 |
| 2009/0006259 A1* | 1/2009 | Hsi | G06F 21/105 705/59 |
| 2009/0138711 A1 | 5/2009 | Heimbigner | |
| 2010/0303241 A1* | 12/2010 | Breyel | G06F 11/1458 380/277 |
| 2012/0163595 A1* | 6/2012 | Kwon | H04N 21/23432 380/201 |
| 2013/0212710 A1 | 8/2013 | Puttaswamy Naga et al. | |
| 2014/0108805 A1 | 4/2014 | Smith et al. | |
| 2014/0208104 A1 | 7/2014 | Yoon et al. | |
| 2014/0317413 A1 | 10/2014 | Deutsch et al. | |

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Revision 116, Mar. 1, 2011, 339 pages.

Amazon Web Services, AWS Key Management Service Developer Guide, Nov. 12, 2014, 126 pages.

* cited by examiner

DATA LOSS PREVENTION WITH KEY USAGE LIMIT ENFORCEMENT

CROSS REFERENCE TO RELATED APPLICATION

This application is a continuation of U.S. application Ser. No. 14/318,422, filed on Jun. 27, 2014, now U.S. Pat. No. 9,882,720, entitled "DATA LOSS PREVENTION WITH KEY USAGE LIMIT ENFORCEMENT," the content of which is incorporated by reference herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). While encryption is generally effective, without proper care being taken, the benefits of encryption can be degraded. In some examples, proper care to maintain data security requires rotation of cryptographic keys so that a single cryptographic key is not used so many times that an analysis of ciphertexts generated under the cryptographic key provides significant information usable to determine the cryptographic key. However, in many systems, tracking how many encryption operations have been performed can be challenging. For example, a distributed computer system may have multiple nodes that each perform operations with a cryptographic key. In such a system, tracking how many encryption operations each node has performed so that the aggregate number of encryption operations under the same key remains at an acceptable level can be complex, especially when the rate of performance of the encryption operations can vary widely among the nodes. One way of preventing too many encryption operations from being performed under the same cryptographic key in a distributed system is to rotate the cryptographic key before any node in the distributed system has the opportunity to cause a limit on the number of encryption operations to be exceeded. Techniques that utilize this approach can result in underutilization of the cryptographic key since key rotation will typically occur before the limit is exhausted.

BRIEF DESCRIPTION OF THE DRAWINGS

Various embodiments in accordance with the present disclosure will be described with reference to the drawings, in which.

DETAILED DESCRIPTION

Figure 1:
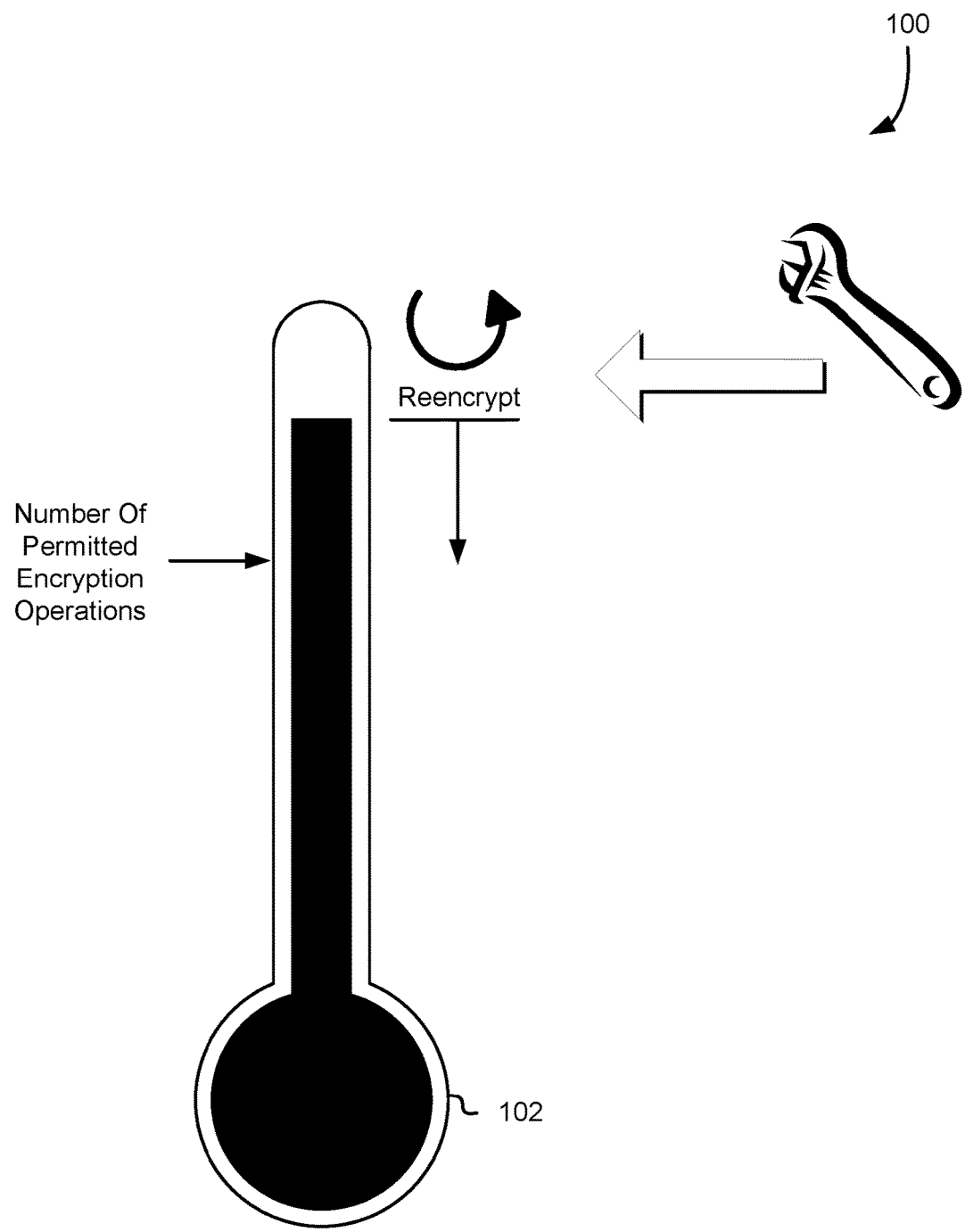
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to cryptographic key rotation for the purpose of enhancing data security. In an embodiment, a distributed system comprises multiple nodes (e.g., physical and/or virtual computing devices) that each have access to and/or utilize a cryptographic key and possibly multiple cryptographic keys. To prevent various types of cryptographic attacks, limits on usage of a cryptographic key for encryption operations are enforced so that access to ciphertexts generated using the cryptographic key does not significantly improve the practicality of cryptographic attacks that, if successful, result in attainment of the cryptographic key. Generally, the usage of the cryptographic key is limited so that the aggregate number of encryption operations performed collectively by the nodes in the system remains within an allowable range.

In a distributed system, however, different nodes may utilize a cryptographic key at different rates. Further, the rates themselves and/or the differences in rates of usage of a cryptographic key may not always be predictable. Consequently, the aggregate usage of a cryptographic key for performance of encryption operations is difficult to calculate accurately in real time, especially when the number of nodes in the distributed system is large. To address this, in some embodiments, usage statistics for the cryptographic key are collected from the individual nodes and used to calculate an aggregate usage of the cryptographic key for encryption operations. The individual nodes may be configured, for instance, to generate usage logs which may be periodically or aperiodically collected and analyzed. The logs may associate the cryptographic key (e.g., through an identifier of the cryptographic key) with various information about usage, such as specific operations performed, numbers of specific operations performed and, generally, the logs may record usage in any suitable manner.

If the calculated usage of the cryptographic key exceeds a limit, the cryptographic key may be rotated. Rotation of the cryptographic key involves replacing the cryptographic key with another cryptographic key in the distributed system. In some embodiments, a key management system tracks which nodes in the distributed system have the cryptographic key and transmits the replacement cryptographic key to the appropriate nodes with instructions configured to cause the nodes to use the current cryptographic key with the replacement cryptographic key. A node, for example, may associate an identifier of the current cryptographic key with the replacement cryptographic key so that, for future requests whose fulfilment requires use of a cryptographic key associated with the identifier, the node utilizes the replacement cryptographic key. Other ways of providing the cryptographic key to the nodes in the distributed system, such as through the use of a consensus protocol, may also be used.

Due to the nature of a distributed system, different nodes in the system may receive the replacement cryptographic key at different times. Between the time when a first node has replaced a cryptographic key with a replacement cryptographic key and a second node replaces the cryptographic key with the replacement cryptographic key, the second node may have performed one or more encryption operations using the cryptographic key being replaced. Generally, multiple nodes may perform encryption operations using a cryptographic key during a process of rotating the cryptographic key in the distributed system. As a result, if a usage limit for the cryptographic key was not already exceeded when the cryptographic key rotation process was initiated, additional encryption operations performed during the cryptographic key rotation process may cause the usage limit to be exceeded.

In various embodiments, when a usage limit for a cryptographic key is exceeded, corrective operations are performed. In an embodiment, the corrective operations involve re-encryption of ciphertexts such that, the number of ciphertexts decryptable with the cryptographic key is within a range specified as acceptable. In some examples, if N encryption operations are allowable before a usage limit is exceeded, with N being a positive integer, the corrective operations result in no more than N ciphertexts decryptable with the cryptographic key being persisted in data storage. In other words, in some embodiments, the corrective operations result in reducing an amount of ciphertext (e.g., number of ciphertexts) decryptable using the cryptographic key to a level that would have been acceptable had the cryptographic key rotation been completed prior to exceeding the usage limit for encryption operations.

The corrective operations may vary in accordance with various embodiments. For example, in some examples, the replaced cryptographic key is used to decrypt a number of ciphertexts which are then encrypted using the replacement cryptographic key. In other examples, the ciphertexts are simply encrypted using the replacement cryptographic key so that both the replaced cryptographic key and the replacement cryptographic key are required to decrypt the ciphertexts. Generally, any operations that reduce the ability to determine the cryptographic key from the ciphertexts may be used.

Reencryptions and/or other corrective operations may be reflected in log updates. For example, if N+K ciphertexts were originally generated using a cryptographic key, with N and K being positive integers, and performance of the corrective operations resulted in N ciphertexts being decryptable using the cryptographic key (e.g., because K ciphertexts were re-encrypted under a replacement cryptographic key), key usage logs may be updated to reflect that N encryption operations were ultimately performed, resulting in persisted data encrypted under the cryptographic key. Logs may also reflect the corrective operations that were performed. Further, encryption operations using the replacement cryptographic key may also be logged such that such encryption operations are counted toward a usage limit for the replacement cryptographic key, which may be ultimately rotated, such as described above and in more detail below.

Numerous variations are considered as being within the scope of the present disclosure. For example, as noted above, some embodiments involve corrective operations being triggered by detection of cryptographic key usage in excess of a usage limit. In such embodiments, corrective operations may be performed and/or scheduled as a result of detection of the cryptographic key usage limit having been exceeded. In other examples, a set of ciphertexts including one or more ciphertexts generated in excess of a cryptographic key usage limit are allowed to be persistently stored. Corrective operations may be performed at a time data is to be accessed from persistent storage. For example, a computer system able to access ciphertexts from persistent data storage may perform, or otherwise cause to be performed, one or more corrective operations as a result of a detected need to access and provide a ciphertext. Such a computer system may, for example, access a ciphertext and, because of previous excess cryptographic key usage detected, reencrypt the ciphertext under a replacement key before providing the ciphertext to another system. Reencryption may be performed in different ways in accordance with different embodiments. For example, in some examples, a ciphertexts is reencrypted by first decrypting the ciphertext to obtain plaintext and then encrypting the plaintext using the replacement key. In other examples, reencryption of a ciphertext includes encrypting the ciphertext using the replacement key to obtain a second ciphertext, the ciphertext being decryptable by first decrypting the second ciphertext to obtain the ciphertext and then decrypting the obtained ciphertext to obtain plaintext. In various embodiments, ciphertexts produced in excess of a usage limit are deleted (e.g., by overwriting memory locations corresponding to the ciphertexts, physically destroying media onto which the ciphertexts are written, or simply rendering inaccessible in other ways) upon reencryption. In some embodiments, such a computer system may provide ciphertexts before encrypting other ciphertexts, but overall operate such that the amount of ciphertexts encrypted under a cryptographic key that are provided to another system comply with a usage limit for the cryptographic key. In yet other examples, a computer system may asynchronously (relative to detection of cryptographic key excess detection) access and reencrypt ciphertexts to comply with cryptographic key usage limits. Generally, in a distributed system, one or more computer systems may be configured to enforce cryptographic key usage limits and the manner in which the cryptographic key usage limits are enforced may vary in accordance with various embodiments.

In some embodiments, a distributed system includes one or more computer systems configured to enforce data loss prevention (DLP) rules, where compliance with one or more DLP rules requires ciphertexts to be generated in compliance with a cryptographic key usage limit for a cryptographic key used to generate the ciphertext. While cryptographic key usage limits are used throughout for the purpose of illustration, the techniques described herein are adaptable to policies that constrain usage of cryptographic keys in general. In some examples, a DLP system operates to prevent ciphertexts from leaving a network unless cryptographically verifiable assurances that key usage limits have been complied with in generating the ciphertexts have been presented. The ciphertexts may be received by the DLP system in various ways, such as in parameters of requests (e.g., API requests) intercepted by the DLP system and/or communications to a data storage system (service). In other examples, the DLP system operates to prevent ciphertexts from becoming available to one or more other systems (e.g., in the same network) unless cryptographically verifiable assurances that key usage limits have been complied with in generating the ciphertexts have been presented.

To enable such a DLP system to operate, computer systems configured with authorization to access and provide ciphertexts may be additionally configured to provide such assurances. In some embodiments, a system configured to access and provide ciphertexts is configured to digitally sign ciphertexts (thereby generating digital signatures of the ciphertexts) and provide the ciphertexts with corresponding digital signatures. In some embodiments, the system digitally signs the ciphertexts with a private key of a public/private key pair used in an asymmetric digital signature scheme and provides a certificate with the public key of the public/private key pair. The certificate may be digitally signed by a trusted authority, such as a certificate authority so that the certificate and, therefore, the digital signature of the ciphertext are cryptographically verifiable. In other embodiments, digital signatures of ciphertexts are generated using a symmetric cryptographic key shared with one or more DLP systems to enable a DLP system to verify the digital signatures.

Other cryptographically verifiable assurances of compliance with a key usage limit may also be utilized in addition to or in alternative to digital signatures of ciphertexts. For example, in some embodiments, a system configured to access and provide ciphertexts is configured with a trusted platform module (TPM) or other cryptographic module that is operable to generate attestations to the state of a computing environment in which the system operates. The attestations may be or may be otherwise based at least in part on cryptographic hashes of executable and/or other code used by the system, such as application code, firmware code, and/or operating system code.

In some embodiments, the system that accesses and provides ciphertexts does so in accordance with executable code executed by the system where the executable code is configured to cause the system to comply with cryptographic key usage limits. In some embodiments, the system provides a cryptographic hash of the code executed by the system (i.e., by one or more processors of the system) where the cryptographic code hash is generated by a TPM or other cryptographic module that is configured to securely store and utilize a cryptographic key. As an example, the cryptographic hash may be a value obtained from a platform configuration register (PCR) of a TPM of the system. The cryptographic hash may be provided with a certificate that encodes or otherwise references a public cryptographic key usable to verify the cryptographic hash. The certificate, as noted, may be digitally signed by a trusted authority (e.g., manufacturer of the TPM) so as to render the certificate cryptographically verifiable.

When a system accesses and provides ciphertexts, the system may transmit the ciphertexts and cryptographically verifiable assurances of key usage limit compliance over a network that is configured to pass the ciphertexts and assurances through a DLP system. The DLP system may be configured on the edge of the network or a sub-network of the network that contains the system that accesses and provides the ciphertexts such that the DLP system is operable to assert control over which communications leave the network or sub-network. In some embodiments, such a DLP system receives communications and determines whether the communications contain a valid cryptographically verifiable assurance of compliance with a cryptographic key usage limit. In some embodiments, multiple communications (e.g., Internet Protocol (IP) packets) may encode a single ciphertext and the DLP system may be configured to aggregate multiple communications encoding a single message (e.g., message containing a ciphertext and cryptographically verifiable assurance of compliance with a cryptographic key usage limit).

In some examples, every communication from the system that provides ciphertexts (whether containing a ciphertext or not) is required by the DLP system to include a valid cryptographically verifiable assurance of compliance with a cryptographic key usage limit. In other examples, code executed by the system communicating with the DLP system is required by the DLP system to identify (e.g., electronically tag) communications that contain ciphertexts subject to a cryptographic key usage limit. Periodic or aperiodic remote attestation to the DLP system using a TPM or other cryptographic module may be based at least in part on code of the communicating system to ensure that the code being executed by the communicating system is unaltered. Such remote attestations (which are example cryptographically verifiable assurances of compliance with a cryptographic key usage limit) may be provided symmetrically with communications from the communicating system (e.g., whether containing ciphertext subject to a cryptographic key usage limit or not) or in accordance with an asymmetrically executing process of the communicating system.

A DLP system may obtain one or more communications that individually or collectively contain a ciphertext and cryptographically verifiable assurance with a cryptographic key usage limit for a cryptographic key used to generate the ciphertext from plaintext. In embodiments where the ciphertexts are digitally signed, the DLP system may generate a reference digital signature based, at least in part, on the ciphertext and compare the reference signature to a digital signature of the ciphertext contained in the one or more communications. The reference signature may be generated using a public key provided in or otherwise referenced in a certificate of the system that provided the ciphertext, using a symmetric cryptographic key shared between the system that provided the ciphertext and the DLP system, or may provide the ciphertext and digital signature to another system configured to verify digital cryptographically verifiable assurances of compliance with cryptographic key usage limits. In embodiments where the one or more communications contain cryptographic hashes of code executed by the system providing the ciphertexts, the DLP system may verify the cryptographic hashes in accordance with the techniques used to generate the cryptographic hashes, which may be the same techniques used for verifying digital signatures and, if applicable, utilizing a certificate of a cryptographic module that generated the cryptographic hashes.

In various embodiments, operation of the DLP system is dependent on whether cryptographically verifiable assurances of compliance with a cryptographic key usage limit are determined to be valid. In some examples, the DLP system does not transmit ciphertexts unless provided with corresponding cryptographically verifiable assurances of compliance with a cryptographic key usage limit. In other examples, the DLP system transmits notifications to specified network addresses when ciphertexts are provided without valid cryptographically verifiable assurances of compliance with a cryptographic key usage limit. In yet other examples, the DLP system is configured to perform one or more corrective operations such as by reencrypting or causing another system to re-encrypt ciphertexts before transmitted further. Combinations and/or other operations may also be performed by the DLP system.

FIG. 1 shows a diagram 100 illustrating various aspects of the present disclosure. In an embodiment a cryptographic key is used with the performance of cryptographic operations, such as encryption operations. The cryptographic key may be a symmetric cryptographic key or an asymmetric cryptographic key (e.g., a private key of a public/private key pair) configured in accordance with the cryptographic algorithms with which the cryptographic key is used. In some examples, the cryptographic key is used in a distributed computer system comprising multiple different devices that each utilizes the cryptographic key for the performance of cryptographic operations. In various embodiments, use of a cryptographic key is subject to one or more usage limits. A usage limit on a cryptographic key may be a limit on a number of certain cryptographic operations performed such as encryption or otherwise be a limit that serves to limit usage of the cryptographic key. Other limits may be based, at least in part, on an amount of time a cryptographic key is usable to perform the limited cryptographic operations, a number of records encrypted using the cryptographic key, an amount of data measured in bits or other units encrypted using the cryptographic key and/or otherwise. Usage limits may be independent of an amount of time ciphertexts encrypted under the cryptographic key have been stored. As noted, the techniques described and suggested herein are applicable in general to policies whose enforcement constrains use of the cryptographic key (and, in some embodiments, multiple cryptographic keys).

In an embodiment a computer system responsible for enforcement of one or more usage limits for the cryptographic key maintains a meter 102 of cryptographic usage. In the example of FIG. 1 the meter 102 is symbolized as a thermometer. The meter 102, in an embodiment, is used to meter the number of encryption operations performed using a particular cryptographic key. A meter utilized by a computer system, however, may take the form of a data structure maintained in memory of, or otherwise accessible to the computer system. As an example, the meter may be a value of a variable maintained in association (e.g., by a table) with the cryptographic key in memory of or otherwise accessible to the computer system. Such a data structure may contain meters for multiple respective cryptographic keys utilized throughout a distributed or other system. Meters may be used in connection with various technique described below.

As illustrated in FIG. 1, a usage limit requires that the cryptographic key be used for up to a specific number of permitted encryption operations. However, also as illustrated in FIG. 1, in some instances the cryptographic key is allowed to be used for a number of cryptographic operations that is greater than permitted by the usage limit. For example, in a distributed computer system where multiple devices may utilize a cryptographic key, maintenance of a central counter of operations performed within the distributed system may be complex and difficult to maintain. As a result, to allow continued performance of such a distributed system and avoid undue delay in processing requests, components of the distributed system utilizing the cryptographic key may be allowed to temporarily and collectively exceed the usage limit. However, when the meter 102 is updated and it is detected that the usage limit has been exceeded, corrective action may be taken. As discussed in more detail below, the corrective action may include re-encryption of one or more records such that, after the re-encryption, the usage limit is complied with. For example, if the usage limit corresponds to a number of records that may be encrypted using a cryptographic key, a number of records may be decrypted using the cryptographic key, re-encrypted using a different cryptographic key such that after the re-encryption using the other cryptographic key, the number of records encrypted under the cryptographic key for which the usage limit was exceeded, falls to an acceptable number. In other words, after the corrective action, the number of records that are persistently stored is as if the usage limit had not been exceeded.

As another example, if a usage limit corresponds to an amount of time which a cryptographic key is usable to perform cryptographic operations, records encrypted using the cryptographic key during a time period may be identified and re-encrypted such that after the re-encryption the total amount of time. The time period selected may be greater than or equal to the amount of time by which the usage limit was exceeded. As an illustrative example, if a set of devices each had access to the cryptographic key collectively for 103 hours (where each device contributed some number of hours that is less than 103 hours to the collective total), and if the usage limit is 96 hours, a seven-hour or greater block of time (or several, non-overlapping blocks of time adding to seven or more hours) may be selected and records encrypted by the cryptographic key during the block (or blocks) may be re-encrypted. A number of re-encryption operations may be minimized or otherwise reduced by selecting a block (or multiple blocks) where fewer encryption operations were performed relative to other blocks of time. Other examples and optimizations are also considered as being within the scope of the present disclosure.

Figure 2:
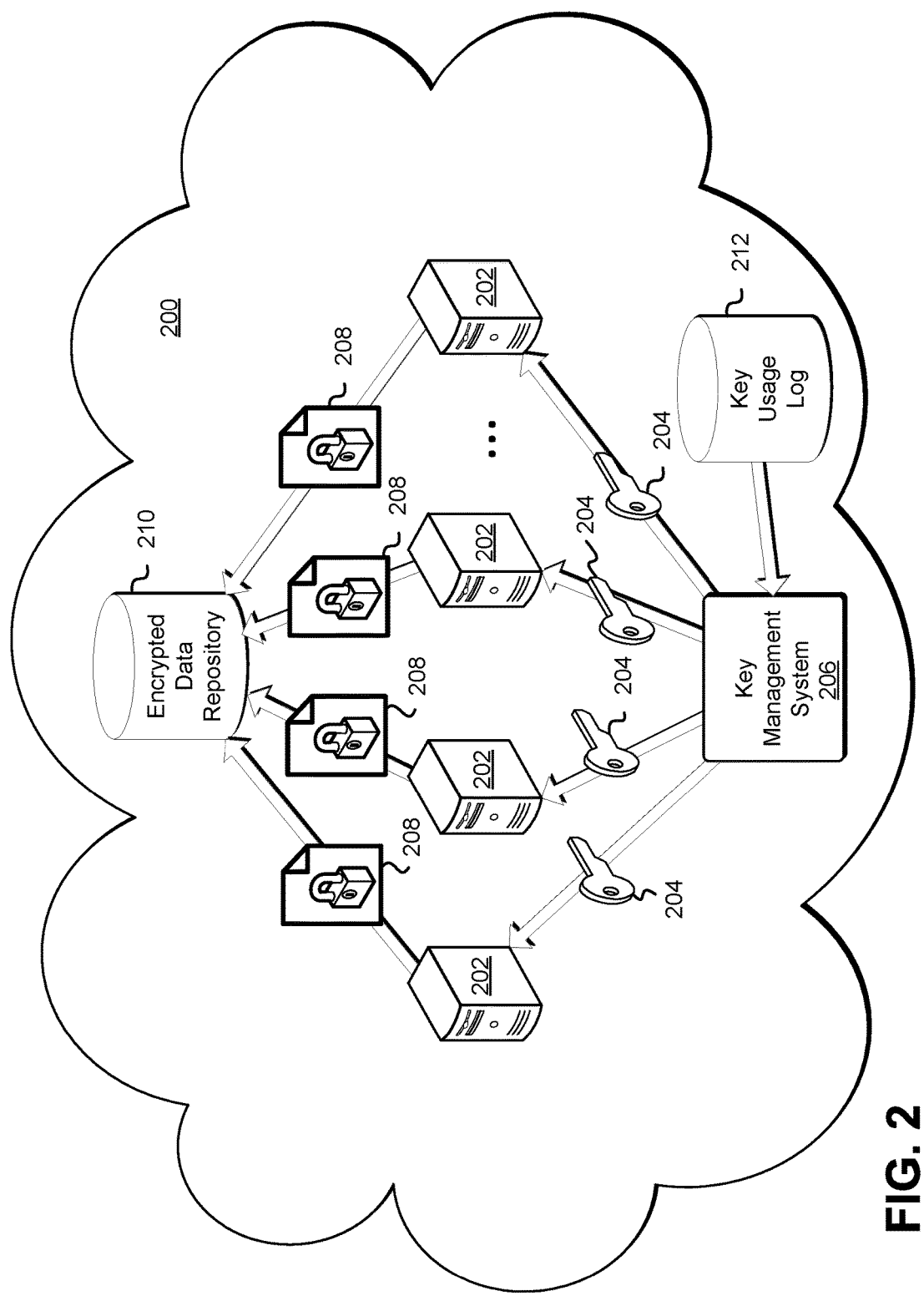
FIG. 2 shows an illustrative example of an environment in which various embodiments can be practiced.

FIG. 2 shows an illustrative example of a network 200 in accordance with various embodiments. The network 200 may comprise a collection of computing devices configured such that subsets of the computing devices are operable to exchange data with one another. The network 200 may be, for example, a network of computing devices that support the operations of an organization. As such, the network 200 may be a private network of the organization. The network 200 may be used for various purposes, and may include various computing devices, such as servers, client devices, data storage devices, switches, routers, network appliances and the like.

In an embodiment, the environment 200 includes a plurality of encryption devices 202, each of which being a computer system that performs encryption operations and possibly other cryptographic operations such as digital signature generation verification and decryption. Example cryptographic operations may be performed in accordance with cryptographic schemes including, but not limited to, cryptographic schemes noted below. In this particular example, each of the encryption devices 202 utilize a cryptographic key 204 which is provided to the encryption devices 202 by a key management system 206. The key management system 206 may be a computer system configured to manage cryptographic keys utilized in the network 200. The key management system 206 may, for instance, provide cryptographic keys to encryption devices 202, may enforce usage limits on the cryptographic keys 204 by rotating cryptographic keys at appropriate times in accordance with programming logic of the key management system 206 and may perform other operations in connection with the duties of the key management system 206 such as monitoring key usage, monitoring individual usage of cryptographic keys by individual encryption devices 202 and/or monitoring aggregated usage of a cryptographic key collectively by the encryption devices 202. In an embodiment, the key management system 206 provides the same cryptographic key 204 to each of the encryption devices 202. In this manner, multiple encryption devices 202 each have a copy of the same cryptographic key. While, to avoid obfuscation, a single cryptographic key is discussed throughout, the key management system 206 may provide multiple keys to the encryption devices 202 such that each of the encryption devices 202 (or a subset thereof) has multiple copies of each key of multiple cryptographic keys. Further, the transfer of cryptographic keys among different components in the network 200 may occur using various techniques, such as a Diffie-Hellman key exchange or other way of achieving secure transfer of cryptographic key.

Each encryption device 202 may utilize the cryptographic key 204 to perform cryptographic operations. For example, an encryption device 202 may utilize the cryptographic key 204 to generate ciphertext 208. An encryption device 202 may obtain plaintext for the generation of the ciphertext 208 in various ways, such as by receiving plaintext from another system not illustrated in the figure or by generating the plaintext itself. The plaintext may be any data desired to be maintained in an encrypted state, at least temporarily, within the network 200. For example, the ciphertext may include encrypted data specified as sensitive and/or one or more cryptographic keys used to encrypt data identified as sensitive. In an embodiment, as illustrated in FIG. 2, ciphertext 208 generated by an encryption device 202 is transmitted to an encrypted data repository 210. The encrypted data repository 210 may be a computer system configured to persistently store data. In one example, the encrypted data repository is a computing device with a data storage device used to persistently store ciphertext 208 and/or other data. As another example, the encrypted data repository 210 may be a computer system with multiple data storage devices, such as a storage area network (SAN). In yet another example, the encrypted data repository 210 may be a service that is operated for the purpose of data storage. The service may comprise multiple data storage devices and may store data on behalf of multiple entities (e.g., multiple customers). The data storage service may have a web service interface usable to make application programming interface (API) calls for the purpose of causing the data storage service to perform data storage operations such as put operations, get operations and/or other operations in connection with the storage of data.

It should be noted that, while FIG. 2 illustrates the encrypted data repository 210 as being within the network 200 illustrated in FIG. 2, the encrypted data repository 210 may communicate with the encryption devices 202 over a public communications network such as the internet. As illustrated in FIG. 2, the network 200 also includes a key usage log 212 accessible by the key management system 206. Further, while illustrated as a component separate from the key management system 206, the key usage log 212 may be maintained in local data storage of the key management system 206. Also, the key usage log 212 or another component in the environment 200 may maintain an index of stored data that associates ciphertexts or other outputs of cryptographic operations with respective cryptographic keys used to generate the outputs. To determine an amount a cryptographic key was used for a particular operation (e.g., encryption), the index may be queried to determine an exact number or to obtain information usable to estimate the amount statistically.

In an embodiment the key management system 206 accesses data from the key usage log 212 to determine a number of cryptographic operations of one or more types that have been performed using the cryptographic key 204 for the purpose of enforcement of usage limits placed upon the cryptograph key 204. In some embodiments, for example, each encryption device 202 is configured to periodically transmit messages to the key usage log 212 that indicate how many cryptographic operations of a certain type, such as encryption, were performed by the encryption device 202 since last reported and/or since the encryption device began using the cryptographic key 204. The key management system 206 or the key usage log 212 may perform computations to determine an aggregated usage of the cryptographic keys 206 of the collection of encryption devices 202.

As discussed in more detail below, when the key management system 206 detects that usage of the cryptographic key 204 has exceeded one or more usage limits placed upon the cryptographic key 204, the key management system 206 may perform a key rotation process for the cryptographic key 204. The key rotation process may include transmitting a new cryptographic key to each encryption device 202 with an instruction to each encryption device 202 to utilize the new cryptographic key in place of the cryptographic key 204 whose use has exceeded one or more usage limits. Upon receipt of such an instruction and a new cryptographic key, an encryption device 202 may utilize the new cryptographic key for future cryptographic operations. The encryption device 202 may discard, that is, erase from memory, the old cryptographic key or may retain the old cryptographic key for use in certain types of cryptographic operations such as decryption of data encrypted under the old cryptographic key.

Further, as discussed in more detail below, the key management system 206 may be configured to determine an amount by which a key usage limit has been exceeded and may perform a process to take corrective action such that, after performance of the process, there is compliance with the key usage limit that was temporarily exceeded. As noted, the performance of the corrective action may restore an amount of data encrypted under the key to a level that would have been attained had the cryptographic key usage limit not been exceeded. In some examples, the key management system 206 may decrypt a sufficient amount of data using the old cryptographic key (i.e., the cryptographic key whose collective usage exceeded the usage limit) and may re-encrypt the decrypted data using the new cryptographic key (i.e., the cryptographic key that replaced the old cryptographic key) or another cryptographic key. The amount of data re-encrypted in this manner, may be sufficient such that the amount of data remaining in persistent storage encrypted under the old cryptographic key is in compliance with the usage limit. As an illustrative example, if the usage limit is that at most N encryption operations can be performed with a cryptographic key, where N is a positive integer, the process performed by the key management system 206 may be performed when it is determined that at a number greater than N records have been encrypted using the old cryptographic key, and after performance of the process to correct exceeding the usage limit, no more than N records may remain encrypted in the data repository 210. As noted, cryptographic key usage may be measured in other ways in addition to or instead of a number of records (e.g., documents or other data objects). Example cryptographic key usage measurements may be based, at least in part, on a number of bits or other units of encrypted data, a collective amount of time devices have access to the cryptographic key for performance of encryption operations and the like.

Figure 3:
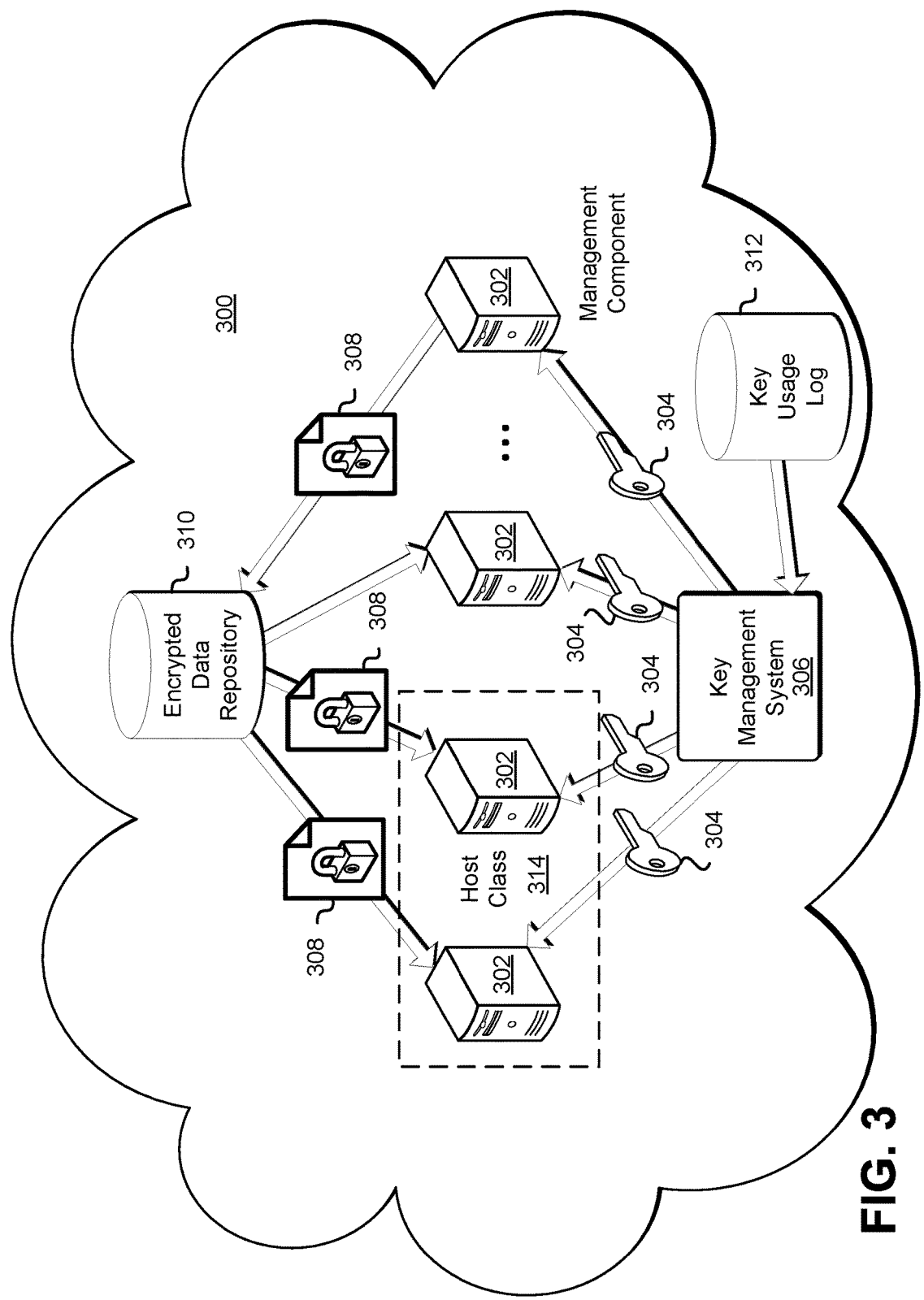
FIG. 3 shows an illustrative example of an environment in which various embodiments can be practiced.

FIG. 3 shows an illustrative example of a network 300 which may be used to implement various embodiments in the present disclosure. The network 300 may be any suitable network such as the network 200 described above in connection with FIG. 2. Accordingly as illustrated in FIG. 3, the network 300 in this example includes a plurality of encryption devices 302, a utilize encryption keys 304 provided by a key management system 306 to perform various cryptographic operations such as encryption. The encryption devices 302, key management system 306 and cryptographic keys 304 may be such as described above. Encrypted data 308 generated by one of the encryption devices 302, and in this particular example, a management component of the network 300 that also serves as an encryption device 302 may be stored in an encrypted data repository 310. Usage of the cryptographic key 304 may be monitored by the key management system 306 using information reported by the encryption devices 302 and stored in a key usage log 312. The encrypted data repository 310 and key usage log 312 may be such as described above in connection with FIG. 2.

In an embodiment, various techniques of the present disclosure allow for efficient distribution of data to a plurality of devices. In this example illustrated in FIG. 3, the management component encryption device 302 obtains plaintext such as by receiving the plaintext or generating the plaintext and uses the cryptographic key 304 to generate ciphertext 308. The management component encryption device 302 may transmit the ciphertext 308 for persistent storage in the encrypted data repository 310. Because other encryption devices 302 have access to a copy of the cryptographic key 304, the encryption devices 302 are able to, in some embodiments, access data encrypted under the cryptographic key 304 from the encrypted data repository 310 and decrypt the accessed data. Accordingly as illustrated in FIG. 3, one or more of the encryption devices 302 may obtain the ciphertext 308 and use the cryptographic key 304 to decrypt the ciphertext 308 to obtain plaintext from the ciphertext 308. In this example, the management component 302 defines a host class 314 comprising one or more encryption devices 302. Members of the host class 314 are instructed via electronic communications to obtain the ciphertext 308 and decrypt the ciphertext 308 using the cryptographic key 304 to obtain plaintext and to perform one or more operations with the plaintext.

In an embodiment, the host class 314 is defined based, at least in part, on a characteristic of the encryption devices 302. In some embodiments, the host class is defined by access to a particular cryptographic key such that, access to the cryptographic key causes a device to be in the host class. Host classes may be otherwise defined (e.g., through electronic tags associated with devices) and generally any attribute of a computing device that is usable to distinguish a computing device from one or more other computing devices may be used to define a host class. In this manner, the management component 302 may pass data to multiple machines efficiently through the encrypted data repository 310 without the plaintext being accessible to entities having access to the encrypted data repository 310 without access to the cryptographic key 304. Such embodiments may be particularly useful, for example, when the encrypted data repository 310 is a multitenant service accessed by multiple entities. In some embodiments, the plaintext is a software update to be incorporated by members of the host class 314. Members of the host class 314 may use the cryptographic key 304 to decrypt the ciphertext 308 and install one or more software updates. In this manner, the management component 302 may push updates to multiple devices in a fleet securely and efficiently. Further, when a host class is defined by access to a cryptographic key, instructions inadvertently transmitted to hosts outside of the host class fail to have effect since hosts outside of the host class cannot decrypt the relevant data without access to the cryptographic key.

Figure 4:
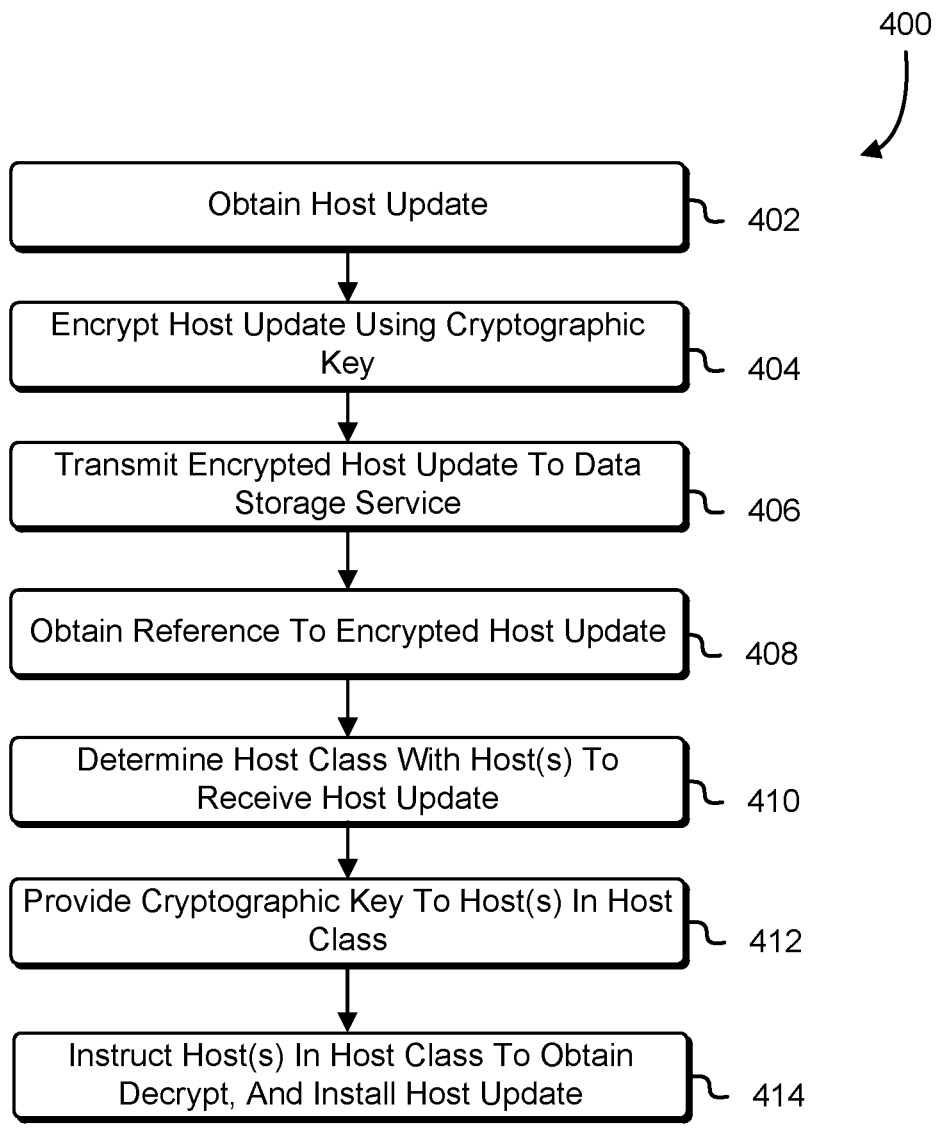
FIG. 4 shows an illustrative example of a process for updating hosts in a distributed system in accordance with at least one embodiment.

FIG. 4 shows an illustrated example of a process 400 for updating hosts in a distributed system in accordance with various embodiments. The process 400 may be performed by any suitable system such as by a management component encryption device 302 discussed above in connection with FIG. 3 or generally by any computer system with the administrative capability for updating other computer systems. In an embodiment, the process 400 may include obtaining 402 a host update. The host update may be obtained in various ways in accordance with various embodiments. For example, a system performing the process 400 may generate the update itself. As another example, the system performing the process 400 may receive the host update from another system such as over a network or otherwise. When the host update has been obtained 402, the process 400 may include encrypting 404 the host update using a cryptographic key. The encrypted host update may then be transmitted 406 to a data storage service or other data storage system. In some embodiments, the data storage service is publicly accessible by customers of a computing resource service provider that operates the data storage service. Further, in some embodiments, the encrypted host update is publicly accessible when stored in data storage service, although policy restrictions on systems able to access the encrypted host update may be used.

In an embodiment, the host update is transmitted to a data storage service by making an API call to the data storage service. The API call may, for instance, identify a logical data container for organizing data storage by the data storage service and may include an identifier of the object comprising the encrypted host update. A reference to the encrypted host update may be obtained 408. Obtaining the reference to the encrypted host update may be performed in various ways in accordance with various embodiments. For example, in some embodiments, the reference is a uniform resource identifier (URI) corresponding to the encrypted host update. In an embodiment where a request to store the encrypted host update is transmitted to the data storage system, a response to the request may include the reference. In other embodiments, a data storage service uses a consistent syntax which, as a result, makes the reference determinable. For example, the encrypted host update may have an identifier generated either by the system performing the process 400 or the data storage service. A logical data container in which the host update is stored within the data storage service may have a URI corresponding to the logical data container. The URI of the logical data container can be used with the identifier of the encrypted host update to form a new URI corresponding to the encrypted host update. The identifier of the encrypted host update may, for example, be appended to an end of the URI of the logical data container with a slash character between the URI of the logical data container and the identifier of the encrypted host update. Generally, any way by which a reference usable to obtain the encrypted host update from the data storage service or other data storage system may be used.

As illustrated in FIG. 4, the process 400 may include determining 410 a host class with one or more hosts to receive the host update. As noted above, a host class may be defined in various ways in accordance with various embodiments. In some examples, for example, a host class is defined by a set of hosts (e.g., encryption devices such as described above in connection with FIGS. 2 and 3) that have access to a cryptographic key usable to decrypt the encrypted host update. As another example, hosts may have attributes where the attributes may be stored in a database. The host class may be determined by identifying hosts with a specified set of attributes. Attributes may, for example, indicate a role of a host in a distributed system, a department for which the host performs one or more operations and/or otherwise. A cryptographic key usable to decrypt the encrypted host update may be provided 412 to the one or more hosts in the host class.

The process may further include instructing 414 the one or more hosts in the host class through electronic communications to obtain, decrypt, and install the host update.

Instructing 414 the host to obtain, decrypt and install the host updates may be performed by transmitting one or more messages with such instructions to the one or more hosts in the host class. The instructions may be configured, for example, to cause a host that receives the one or more instructions to transmit a request to obtain the encrypted host update from the data storage service to use the provided 412 cryptographic key to decrypt the encrypted host update hat was obtained from the data storage service and to perform an installation process of the host update which may include executing executable code of the host update. In some embodiments, instructions are not sent to the hosts in the host class. The hosts in the host class may, for instance, be configured to periodically or aperiodically query a data storage service for a new update and, if a new update is found, download and install the update.

As with all processes described herein, other variations are also considered as being within the scope of the present disclosure. For example, the order in which certain operations are performed may vary in accordance with various embodiments. Generally, when one operation does not depend on another operation having been performed, the two operations may be performed in any order including, but not limited to, fully or partially in parallel. For example, referring to FIG. 4 as noted, a host class may be defined by access to a cryptographic key usable to decrypt an encrypted host update. Accordingly, the cryptographic key may be provided 412 at any point during performance of the process 400. Similarly, the host class may be determined as an initial operation of performance of the process 400 or generally at any point during performance of the process 400. In addition, different operations may be performed by different systems and or different systems may be utilized for the performance of certain operations. For example, a key management system may provide the cryptographic key instead of a system performing the process 400. Said another way, a key management system may be a component of a distributed system that performs the process 400. Similarly, a device that encrypts the host update may be different than a device that defines the host class and/or instructs the one or more hosts in the host class to obtain, decrypt and install a host update. Other variations are also considered as being within the scope of the present disclosure.

Figure 5:
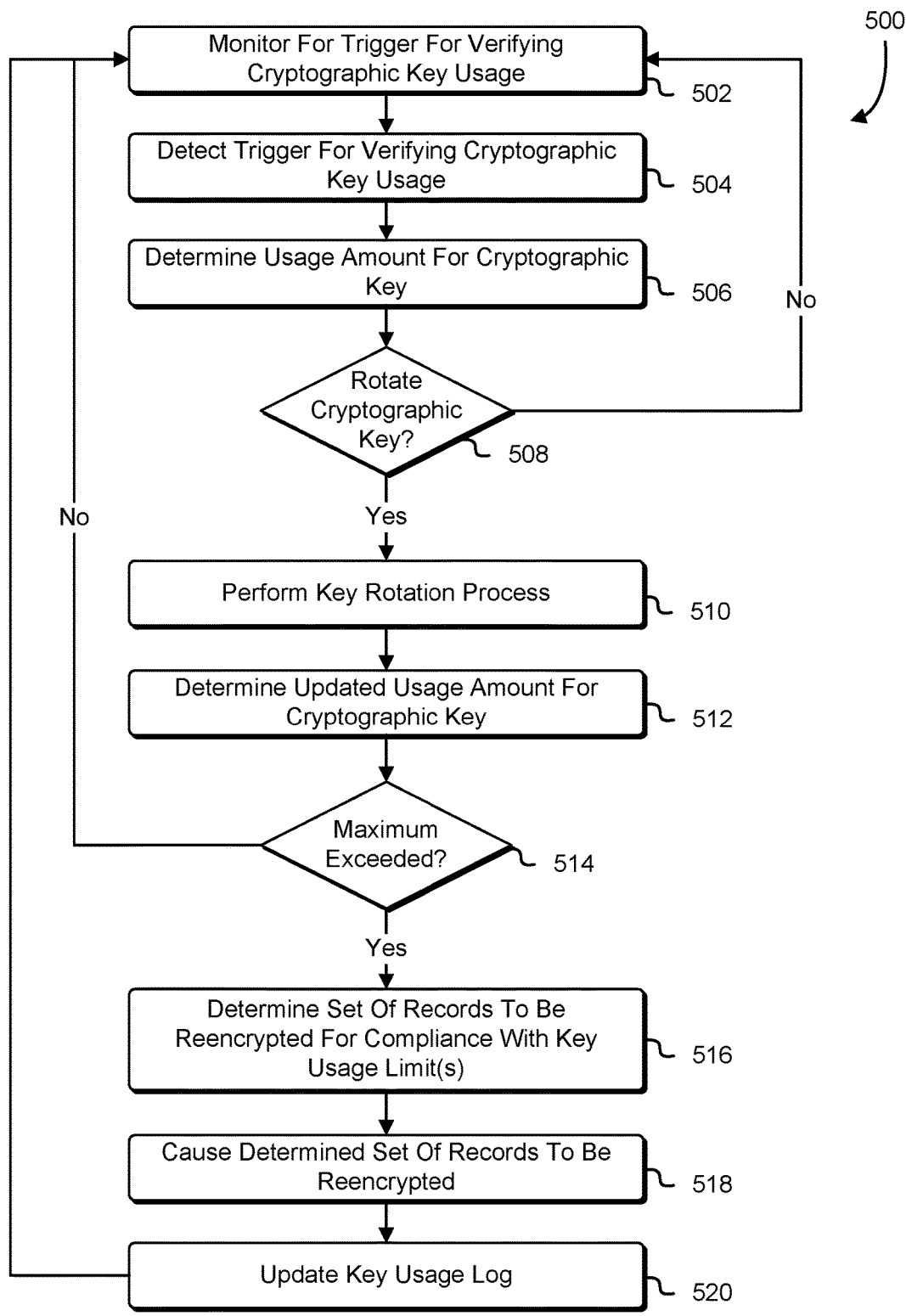
FIG. 5 shows an illustrative example of a process for enforcing a limit on cryptographic key usage in accordance with at least one embodiment.

As noted, various techniques described above are usable to perform various types of operations in accordance with various embodiments in addition to updating hosts in a distributed system. FIG. 5 shows an illustrated example of a process 500 for enforcing usage limits for cryptographic keys in accordance with an embodiment. The process 500 may be performed by any suitable system, such as by a key management system described above in connection with FIGS. 2 and 3, or generally any system with administrative capabilities, i.e., permissions, sufficient for performing operations of the process 500. In an embodiment, the process 500 includes monitoring 502 for a trigger for verifying cryptographic key usage. The trigger may be, for example, an instruction received from another system or an instruction issued as part of execution of another process or generally any event whose occurrence causes the performance of the process 500 to initiate. The trigger may also be a clock-based trigger where, for example, cryptographic key usage is monitored periodically and/or on a schedule. Accordingly, the process 500 may include detecting 504 the trigger for verifying the cryptographic key usage.

Once the trigger has been detected 504, a usage amount for a cryptographic key may be determined 506. The usage may be determined in various ways in accordance with various embodiments. For example, in some embodiments, a database is configured to store aggregated key usage statistics for a plurality of encryption devices having access to an encryption key. Another process being performed may result in the aggregated usage for the cryptographic key being calculated and updated in the database. As another example, a database may associate with the cryptographic key individual usage amounts for individual encryption devices and determining 506 the usage amount for the cryptographic key may include calculating an aggregated usage amount such as by adding individual usage amounts for individual encryption devices. In some embodiments, logs of key usage are sampled and determining the usage amount includes statistically estimating an amount the cryptographic key was used. In other examples, metadata of ciphertexts, which may be a sampling of ciphertexts, are examined to identify ciphertexts encrypted under the cryptographic key to determine a usage amount (e.g., number of ciphertexts produced using the cryptographic key).

Further, the usage amount may be determined in other ways depending on one or more ways by which key usage is measured. In some examples, key usage amount is measured by a number of encryption operations that have been performed. As another example, a usage amount may be calculated based at least in part on an amount of time a device has access to a cryptographic key for the performance of cryptographic operations. In this latter example, if a first encryption device has access for two hours and a second encryption device has access for three hours, the aggregated usage amount for the two devices may be calculated as five hours. As noted above, individual usage amounts and aggregations thereof may be calculated in other ways, such as a number of records encrypted under a cryptographic key and/or an amount of data measured in bits or other units (e.g., bytes, kilobytes, megabytes, etc.). Generally any suitable way of determining 506 usage amounts for the cryptographic key may be used.

Once the usage amount for the cryptographic key is determined 506, the process 500 may include determining 508 whether to rotate the cryptographic key. Determining 508 whether to rotate the cryptographic key may be performed in various ways in accordance with various embodiments. For instance, in some embodiments, a threshold value below a maximum value is used to determine whether to rotate the cryptographic key such that if the aggregated usage amount for the cryptographic key exceeds the threshold, the determination whether to rotate the cryptographic key is positive but if the aggregated usage amount for the cryptographic key is at or below the threshold, the determination whether to rotate the cryptographic key is negative. More complex ways of determining 508 whether to rotate the cryptographic key may be used in various embodiments. For example, past usage amounts may be used to estimate the usage amount at the next determination 508 whether to rotate the cryptographic key. If the estimate indicates that the usage amount will exceed a maximum amount for the cryptographic key, the determination 508 may be positive and if the estimate indicates that the usage amount will not exceed the maximum amount, the determination 506 may be negative.

If it is determined 508 that the usage amount does not exceed the maximum. The process 500 may proceed to include further monitoring 502 for a trigger for verifying cryptographic key usage. The process 500 may then repeat such as described above. If, however, it is determined 508 that the usage amount does exceed the maximum, the process 500 may include performing 510 a key rotation process. Performance of the key rotation process may include configuring a set of encryption devices to utilize a new cryptographic key instead of the cryptographic key whose usage exceeded the maximum. Such configuration may be performed by transmitting over a network instructions to the individual encryption devices to make such a replacement. The cryptographic key may also be transmitted to the individual encryption devices, such as by using a Diffie-Hellman key exchange or other secure transfer of the cryptographic key. In some embodiments, cryptographic keys are associated with identifiers and as such the encryption devices may be instructed to re-associate the identifier of the cryptographic key with a new cryptographic key so that for future operations directed to be performed using the cryptographic key corresponding to the identifier, the encryption devices utilize the new cryptographic key.

It should be noted that during performance of the key rotation process in a distributed system, encryption operations using the cryptographic key may continue to be performed. For example, transmitting a new cryptographic key to multiple devices may take an amount of time during which encryption devices that have yet to receive the cryptographic key may continue to perform cryptographic operations. Accordingly, the process 500 may include determining 512 an updated usage amount for the cryptographic key. Determining the updated usage amount may be performed such as described above in connection with determining the usage amount such as by analyzing one or more usage logs and in particular analyzing records of key usage logs associated with the cryptographic key. The determined 512 updated usage amount for the cryptographic key may be used to determine 514 whether to perform a key rotation process. For example, if the determined 512 updated usage amount exceeds a usage limit for the cryptographic key, the determination 514 may be positive. If, however, the determined usage amount is less than a usage limit for the cryptographic key, the determination 514 may be negative. If determined 514 to not perform the key rotation process, the process may include further monitoring 502, such as described above.

If, however, it is determined 514 to perform the key rotation process, the process 500 may include determining 516 a set of records to be re-encrypted for compliance with one or more key usage limits. Referring to an example discussed above, if a cryptographic key usage limit specifies that no more than N encryption operations should be performed with a cryptographic key and the updated usage amount indicates that more than N encryption operations have been performed, the number of records may be determined 516 such that after re-encryption, N or less records remain encrypted under the cryptographic key. As another example, if the usage limit is a limit on amount of time that a cryptographic key is available for use in performance of cryptographic operations, the set of records may be determined as a set of records encrypted within a certain time period such that after re-encryption has been performed documents remaining encrypted under cryptographic key correspond to an aggregated time period that is less than or equal to the amount of time specified by the usage limit. Other variations are also considered as being within the scope of the present disclosure.

Once the set of records to be re-encrypted for compliance with one or more key usage limits has been determined 516, the process 500 may include causing 518 the determined set of records to be re-encrypted using a new cryptographic key, namely, the cryptographic key which replaced the old cryptographic key upon performance 510 of the key rotation process. The determined set of records may be caused 518 to be re-encrypted in various ways in accordance with various embodiments. In some examples, the system performing the process 500 accesses the determined set of records and performs the re-encryption itself. In other examples, instructions and/or configuration information are/is transmitted to another system to cause the other system to obtain the documents and perform the re-encryption operation. In yet another example, some of the records may be re-encrypted by the system performing the process 500 while instructions and/or configuration information may be sent to another system to access and re-encrypt other records. Other variations are also considered being within the scope of the present disclosure.

Once the determined set of records has been re-encrypted the process 500 may include updating 520 key usage logs to indicate a number of records encrypted under the old cryptographic key that is in compliance with the one or more key usage limits. For example, the logs may be updated to indicate that N or less encryption operations have been performed. As another example, a log entry may just simply indicate that a corrective process has been performed to ensure compliance with the one or more key usage limits.

Figure 6:
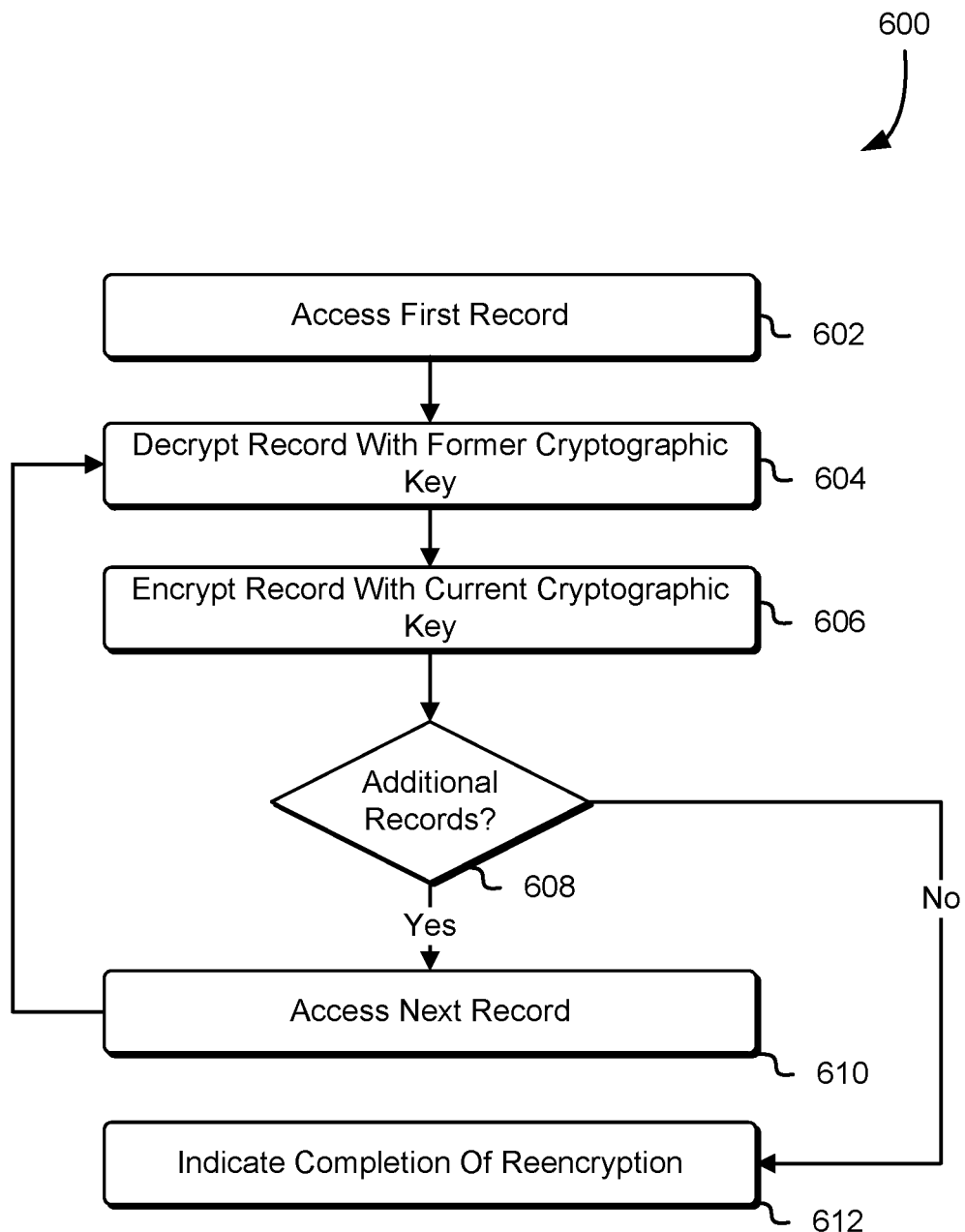
FIG. 6 shows an illustrative example of a process for correcting over-usage of a cryptographic key in accordance with at least one embodiment.

FIG. 6 shows an illustrative example of a process 600 for re-encrypting data in accordance with various embodiments. The process 600 may be performed by any suitable system such as by a key management system such as described above or another system such as an encryption device operating under the control of the key management system or other system that operates to enforce cryptographic key usage limits. The process 600 may be performed as part of the process 500 discussed above in connection with FIG. 5 or separate therefrom. In an embodiment, the process 600 includes accessing 602 a first record. The first record may be accessed in various ways in accordance with various embodiments and, generally, in accordance with a manner by which the record is stored. For example, as noted above, in some embodiments records are stored using a data storage service with a web service API. Accordingly, accessing the first record may include transmitting an API call to get the first record and receiving a response to the API call with the first record. The API call may be configured with authentication information (e.g., a digital signature) for authentication. As another example, in some embodiments, the first record may be obtained by accessing the record from local data storage or from a storage area network or other device within a local area network using an appropriate interface of a device which stores the record. Generally, the record may be accessed in any suitable way in accordance with various embodiments. Further, while FIG. 6 shows the process 600 as including sequential access and re-encryption of records, the process 600 may be adapted to proceed in other ways, such as by accessing the records in a batch.

When the first record has been accessed 602, the process 600 may include decrypting 604 the first record using a former cryptographic key, that is, a cryptographic key usable to decrypt the record. The decrypted record may then be encrypted 606 with a current cryptographic key. Additional operations not illustrated in the figure, such as calculating a checksum of plaintext to determine integrity of the data, performing one or more corrective operations if the checksum indicates the data has been corrupted (e.g., incorrectly decrypted), transmitting the re-encrypted 606 record back to data storage from which the record was accessed for re-encryption or otherwise persistently storing the record and/or performing one or more operations that result in ciphertext encrypted with the previous (old) cryptographic key immediately or eventually being removed (e.g. overwritten) from memory. A determination may be made 608 whether there are additional records to decrypt and re-encrypt, and if it is determined 608 that there are additional records the process 600 may include accessing 610 the next record. The next record may be accessed in any suitable manner, such as the same manner by which the first record was accessed. The next record may be decrypted 604 and encrypted 606 such as described above so that, as a result, the next record is encrypted using the current cryptographic key.

Portions of the process 600 may repeat such as indicated in FIG. 6 until it is determined 608 that there are no additional records. At this time the process 600 may include indicating completion of re-encryption of the records at issue. The indication may include, for example, an electronic notification to a system enforcing a usage limit for the cryptographic key for which the process 600 is being performed, such as a system performing the process 500 discussed above or variations thereof. The indication may be a local (intra-computer system) message and/or message transmitted over a network to another system. As noted, numerous variations of the process 600 are considered as being within the scope of the present disclosure. For instance, the process 600 as illustrated in the figure shows a process by which a set of records are sequentially re-encrypted. In various embodiments the records may be re-encrypted in other ways. For example, the process 600 may be modified so as to be parallelizable such that some or all of the records are re-encrypted in parallel. Other variations are also considered as being within the scope of the present disclosure.

Figure 7A:
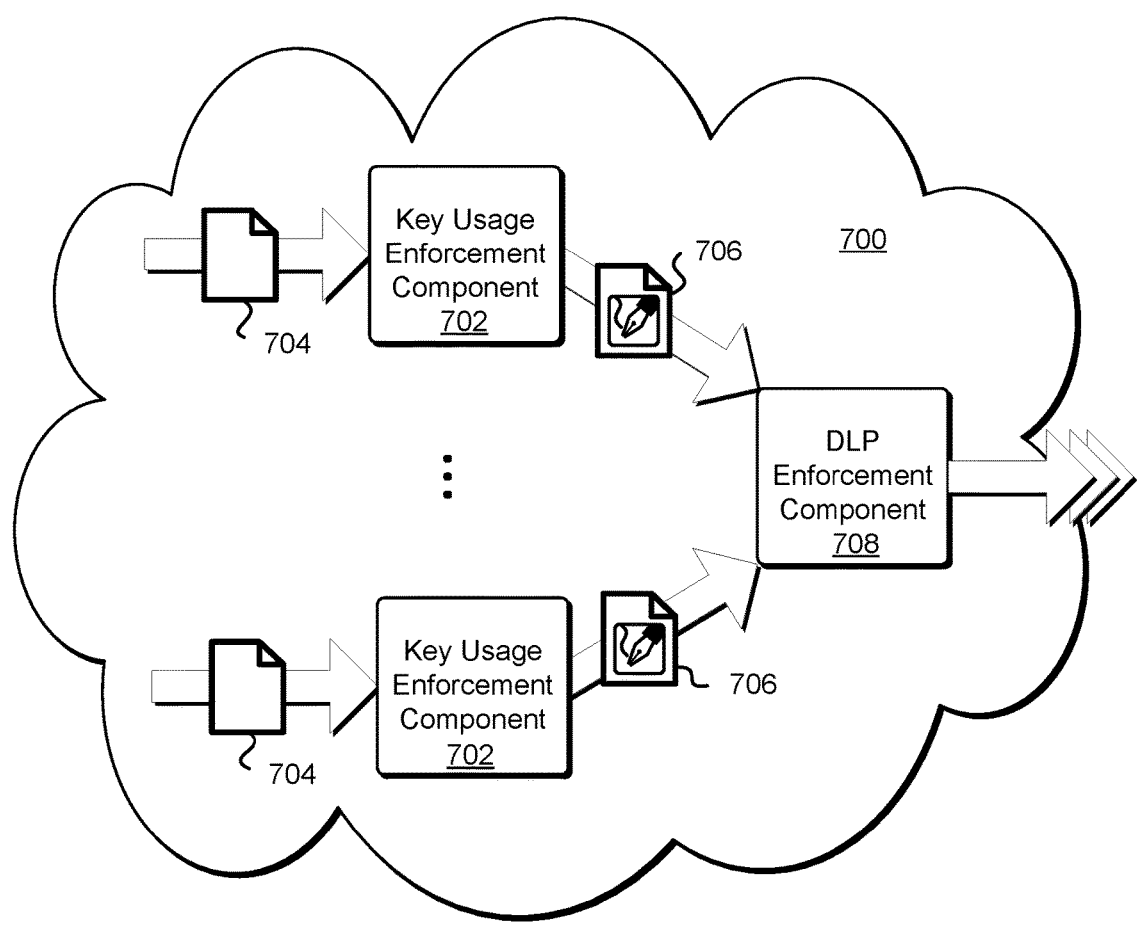
FIG. 7A shows an illustrative example of an environment in which various embodiments may be practiced.

FIG. 7A shows an illustrative example of a network 700 which may be used to implement various aspects of the present disclosure. The network 700 may be a collection of computing devices collectively configured such as described above in connection with FIGS. 2 and 3. In this particular example, the network 700 includes a plurality of key usage enforcement components 702. A key usage enforcement component may be a computer system such as a computing device configured to, as part of its operations, enforce one or more key usage limits where the key usage limits may be such as described above. As an example, an encryption device such as described above in connection with FIGS. 2 and 3 may be a key usage enforcement component 702. However, key usage enforcement components may be other systems, such as systems that create encrypted data, systems that access encrypted data, and other systems. As another example, a key usage enforcement component 702 may be a request handler, that is, a system configured to process requests that are received into the network 700. Such requests may include, for instance, requests to perform operations in connection with persistently stored ciphertexts, such as requests to retrieve ciphertexts, request to store ciphertexts, requests to obtain information about stored ciphertexts and the like. Other types of key usage enforcement components may also be used.

As illustrated in FIG. 7A, a key usage enforcement component 702 may obtain an encrypted data record 704. In some embodiments, the key usage enforcement component 702 generates the encrypted data record 704 itself. In other embodiments, the key usage enforcement component 702 accesses the encrypted data record 704 from another system, such as a data storage system which may be a data storage service. Further, as illustrated in FIG. 7A the key usage enforcement component 702 may be configured to calculate the results of one or more cryptographic operations performed based at least in part on the encrypted data record 704 or a portion thereof. In the example of FIG. 7A, the key usage enforcement component 702 is configured to generate a digital signature of the encrypted data record 704, thereby resulting in a digitally signed encrypted data record 706 where the digitally signed encrypted data record comprises the encrypted data record 704 and a digital signature based at least in part on the encrypted data record 704.

The digitally signed encrypted record 706 may also include other information such as the output of one or more cryptographic operations generated based at least in part a state of a computer environment of the key usage enforcement component 702. In some examples, for instance, the key usage enforcement component 702 includes a trusted platform module (TPM) that generates cryptographic hashes of executable code of the key usage enforcement component 702 such as application code, operating system code, and/or firmware utilized by the key usage enforcement component 702. Thus the digitally signed encrypted data record 706 may include one or more platform configuration register values. It should be noted that in various embodiments such as embodiments where the encrypted data record includes an attestation as to the state of the computing environment of the key usage enforcement component 702, the digitally signed encrypted data record 706 may lack a digital signature of the encrypted data record 704, but may include the attestation. Other variations are also considered as being within the scope of the present disclosure.

In an embodiment, the key usage enforcement component 702 is configured to generate the digitally signed encrypted data record 706 prior to transmission of the encrypted data record 704. In an embodiment, the key usage enforcement component 702 is configured to transmit outgoing data to one or more data loss prevention (DLP) enforcement components 708 in the network 700. The key usage enforcement component 702 may, for example, generate an application-layer request (i.e., at a higher level than levels 3 and 4 of the Open Systems Interconnection (OSI) model) to store the record in a data storage system, which may be a data storage device or system comprising multiple data storage devices. The DLP enforcement component 708 may be a computer system, such as a network appliance configured to receive network traffic and enforce one or more DLP rules against the traffic received such that only data satisfying one or more DLP rules may exit the network 700.

In an embodiment, the DLP enforcement component 708 is configured to detect and analyze digitally signed encrypted data records in accordance with one or more DLP rules. As part of analyzing a digitally signed encrypted data record 706, the DLP enforcement component 708 may verify a digital signature of the digitally signed encrypted data record 706 and/or an attestation included with the digitally signed encrypted data record 706. In some embodiments, the DLP enforcement component 708 is configured to block traffic from the key usage enforcement components 702 when traffic from the key usage enforcement component 702 lacks a valid digital signature and/or attestation. It should be noted, however, that the DLP enforcement component 708 may employ more complex logic where certain transmissions lacking a digital signature may be allowed through depending at least in part on an origin on the traffic, a destination of the traffic, or otherwise. It should also be noted that in the example of FIG. 7A the DLP enforcement component 708 is illustrated to enforce DLP rules against traffic addressed to locations outside of the network 700. The DLP enforcement component 708, however, may enforce DLP rules even for traffic not addressed to destinations outside of the network 700. For example, in some embodiments, the DLP enforcement component 708 is configured to enforce one or more DLP rules to traffic that may not be addressed to a destination outside of the network 700 but to a destination within the network 700 such as a destination from which encrypted data records may become accessible outside of the network 700 or to certain entities within the network 700. Other variations are also considered as being within the scope of the present disclosure.

The DLP enforcement component 708 may be implemented in various ways in accordance with various embodiments. For example, in addition to implementations discussed above, the DLP enforcement component may be configured as a program module that analyzes data in a network stack implemented on a device implementing a key usage enforcement component 702. If the digital signature of the data is valid and any other requirements are satisfied, the DLP enforcement component may allow the data to proceed to its destination, such as by being transmitted over a network. If the digital signature is invalid or if any other requirements are not met, the DLP enforcement component may delete the data from the network stack or otherwise prevent the data from being transmitted to its destination or otherwise prevent the data from being transmitted in its current form, which may include modifying the data.

Figure 7B:
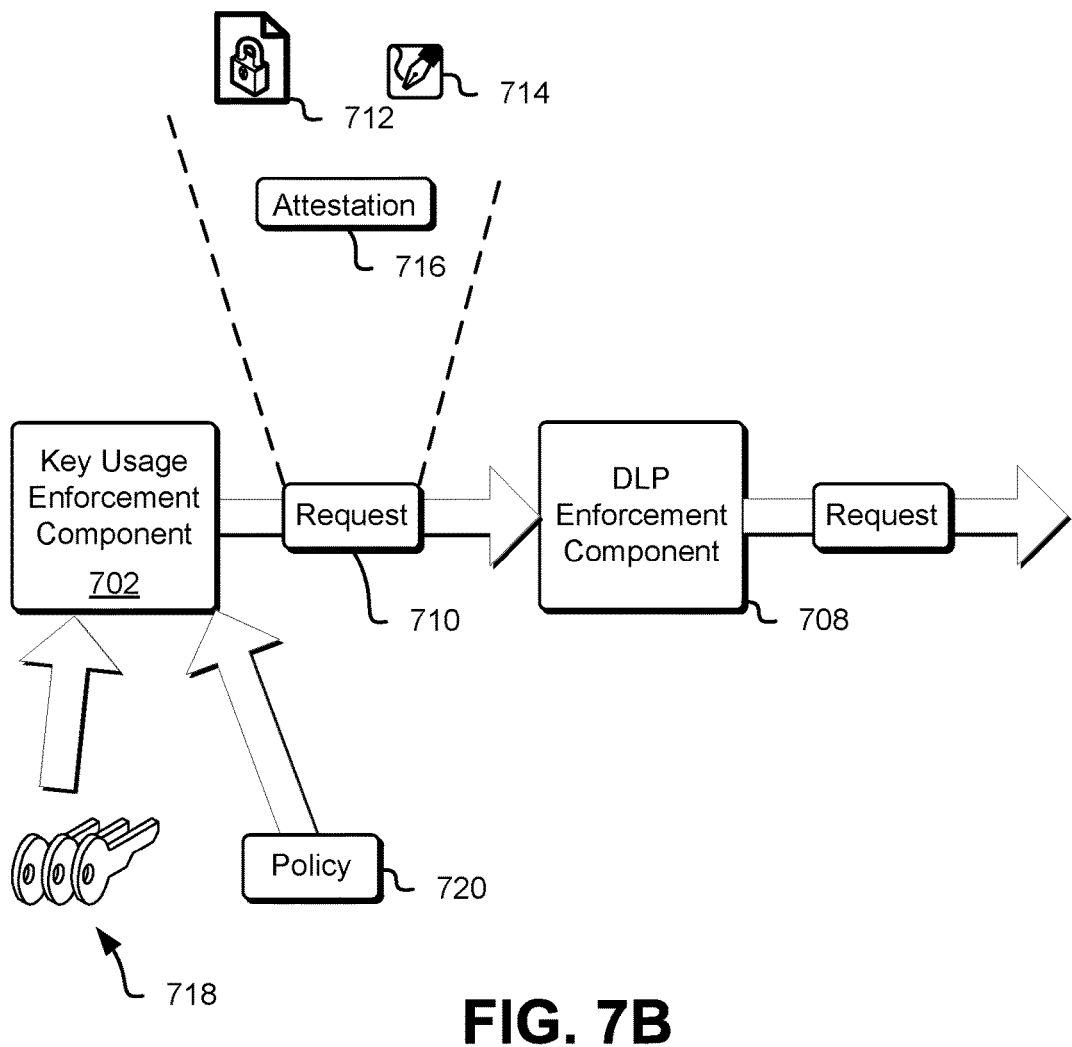
FIG. 7B shows an illustrative example of information being transmitted between components of the environment shown in FIG. 7A.

FIG. 7B shows an illustrative example of one way in which various techniques illustrated in connection with FIG. 7A may be implemented. Specifically, FIG. 7B shows a key usage enforcement component 702 and a DLP enforcement component 708, such as described above in connection with FIG. 7A. As part of its operation, the key usage enforcement component 702 may generate a request 710, which may be an application-layer request to cause another system to perform an operation in connection with data contained in the request. For example, the request 710 may be a web service request to a data storage service to cause the data storage service to store the data.

As illustrated in FIG. 7B, the request 710 may be configured with various components. For example the request 710 may include an encrypted data record 712. The request 710 may also include a digital signature 714 of the encrypted data record 712 or information that includes the encrypted data record (e.g., a portion of the request without the digital signature 714). An attestation 716 may also be included, which may be generated by a TPM or other root of trust associated with the key usage enforcement component 702. The attestation may indicate that executable code executed by the key usage enforcement component 702 (e.g., firmware, operating system code and/or one or more applications) are in an approved state, which may indicate that the key usage enforcement component enforces one or more policies on cryptographic key usage, such as a limit on a number of ciphertexts encrypted under a certain cryptographic key may be provided and/or stored.

The key usage enforcement component 702 may receive cryptographic keys 718 (e.g., from a key management system) and one or more policies 720 to configure the key usage enforcement component to utilize the cryptographic keys 718 in compliance with the one or more policies 720. The cryptographic keys may be used by the key usage enforcement component, for example, to generate encrypted data records (e.g., the encrypted data record 712) and to generate digital signatures, such as the digital signature 714. Different cryptographic keys may be used for encryption than used for digital signature generation. A cryptographic key used by the key usage enforcement component may be used to generate signatures that are cryptographically verifiable by the DLP enforcement component 708. For example, the cryptographic key may be a symmetric cryptographic key shared as a secret with the DLP enforcement component 708. As another example, the cryptographic key may be a private key where the DLP enforcement component has access to a corresponding public key, such as by a certificate stored by the DLP enforcement component and/or provided in the request 710. The certificate, in this example, may be digitally signed or otherwise made cryptographically verifiable by a root of trust the DLP enforcement component is configured to trust. The one or more policies 720 may be information that encodes a cryptographic key usage limit, such as described above.

When a request 710 is transmitted by the key usage enforcement component 702 (which may be transmitted using multiple IP packets), the request 710 may be intercepted by the DLP enforcement component. The DLP enforcement component 708 may determine whether to block the request. For example, the DLP enforcement component may determine whether the request contains an encrypted data record, which may include examining the data for one or more markers indicating that the data is encrypted. If the request contains an encrypted data record, the DLP enforcement component may parse the request to obtain the encrypted data record 712, the digital signature 714, and the attestation 716 (or determine if one or more of the digital signature 714 and the attestation 716 are absent from the request 710). The attestation 716 and digital signature 714 may be cryptographically verified by the DLP enforcement component and successful verification of at least both may indicate that the key usage enforcement component 702 is operable to enforce the one or more policies 716 on the cryptographic keys 718 and, in particular, the cryptographic key used to generate the encrypted data record 712. As a result, the DLP enforcement component 708 may transmit the request 710 to a destination of the request 710 (or generate a different request that lacks one or more of the attestation 716 and digital signature 714). If however, the DLP enforcement component 708 determines that the request 710 lacks a valid attestation and/or digital signature, the DLP enforcement component may block the request 710 from being transmitted further, may modify (e.g., encrypt further) the encrypted data record 712 and/or perform one or more other operations, such as transmitting one or more notifications to a predetermined location (e.g., network and/or email address).

Figure 8:
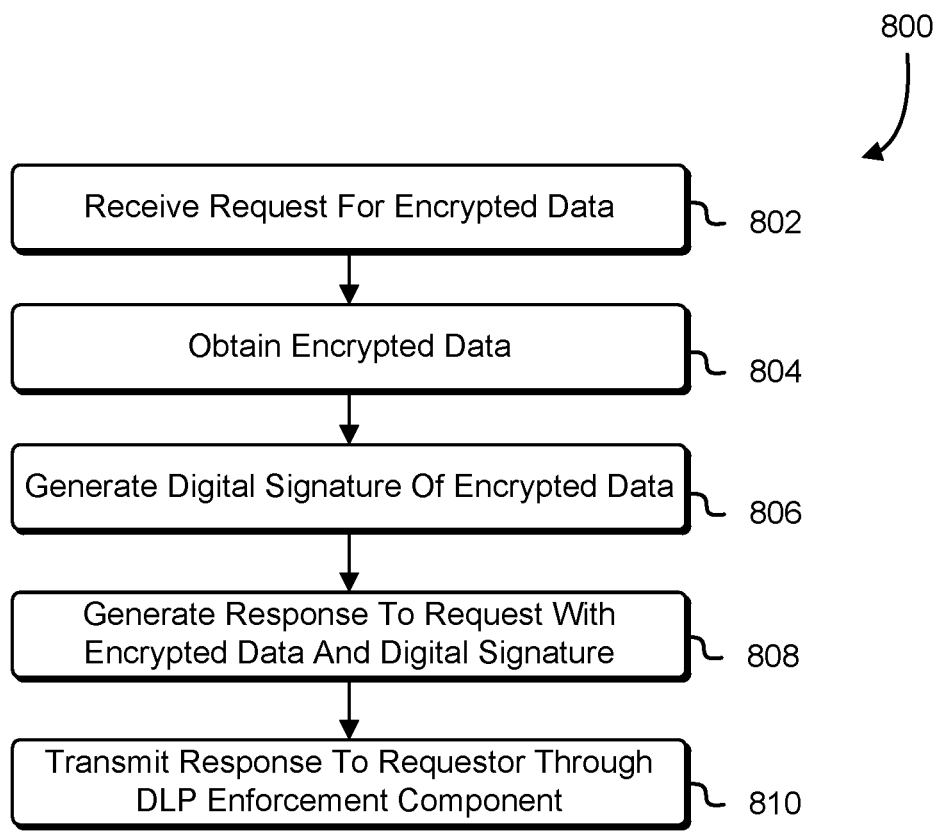
FIG. 8 shows an illustrative example of a process for transmitting data in accordance with at least one embodiment.

FIG. 8 shows an illustrative example of a process for enabling DLP enforcement in accordance with various embodiments. The process 800 may be performed by any suitable system such as by a key usage enforcement component described above in connection with FIG. 7A. In an embodiment, the process 800 includes receiving 802 a request for encrypted data. The request may be received 802 in various ways in accordance with various embodiments. In some examples, a system performing the process 800 provides a web service API and receives a request via the API. Generally, any way by which an electronic request may be received may be utilized. In response to the request the process 800 may include obtaining 804 encrypted data. The encrypted data may be obtained in various ways such as described above. For example, the encrypted data may be obtained from local data storage or by transmitting a request to a remote data storage service. In some embodiments, the encrypted data is obtained in a data packet (e.g., IP packet) or in multiple data packets that collectively comprise the encrypted data. In some embodiments, the obtained 804 data is a complete encrypted record. In other embodiments, the obtained 804 data is a portion of a complete data record (e.g., when the record is too large to send in a single data packet).

When the encrypted data has been obtained 804 the process 800 may include generating 806 a digital signature of the obtained 804 encrypted data. The digital signature may be generated in various ways in accordance with various embodiments. For example, in some embodiments the digital signature comprises a cryptographic hash which is output of a cryptographic hash function. As such, the digital signature may be generated based at least in part on a cryptographic key. In an embodiment, the cryptographic key used to digitally sign the encrypted data is different from a cryptographic key under which the data is encrypted, although in some embodiments, the cryptographic key used both to encrypt the data and generate the digital signature may be the same. It should be noted that the encrypted data may be digitally signed in various ways in accordance with various embodiments. For example, a complete encrypted record may be digitally signed, a portion of an encrypted record may be digitally signed directly (e.g., input into a cryptographic hash function), or the complete encrypted data or a portion thereof may be encapsulated in other data (e.g., a data packet) and the encapsulated data may be digitally signed. Other variations are also considered as being within the scope of the present disclosure.

In some embodiments, the digital signature is generated 808 using the elliptic curve digital signature algorithm, although other algorithms, whether symmetric or asymmetric, such as described below, may also be used in various embodiments. In an embodiment, the process 800 includes generating 808 a response to the request with the encrypted data and the digital signature. Generating the response may be performed in various ways in accordance with various embodiments. For example, in some embodiments the request is received in accordance with a particular protocol. The response may be generated to comply with the protocol by which the request was received 802. Generally, generating the response may be generating information organized in a way such as to be transmittable to another entity in response to the request.

Once the response has been generated 808, the process 800 may include transmitting 810 the generated response to the request or through a DLP enforcement component where the DLP enforcement component may be such as described above in connection with FIG. 7A. Transmitting 810 the response through the DLP component may be performed in various ways in accordance with various embodiments. In some examples, a network is configured such that traffic from the system performing the process 800 is routed through the DLP enforcement component. In other embodiments, a system performing the process 800 selectively routes communications through the DLP enforcement component such as communications that programming logic of system performing the process 800 has caused the system performing the process 800 to digitally sign. Other variations are also considered as being within the scope of the present disclosure.

Figure 9:
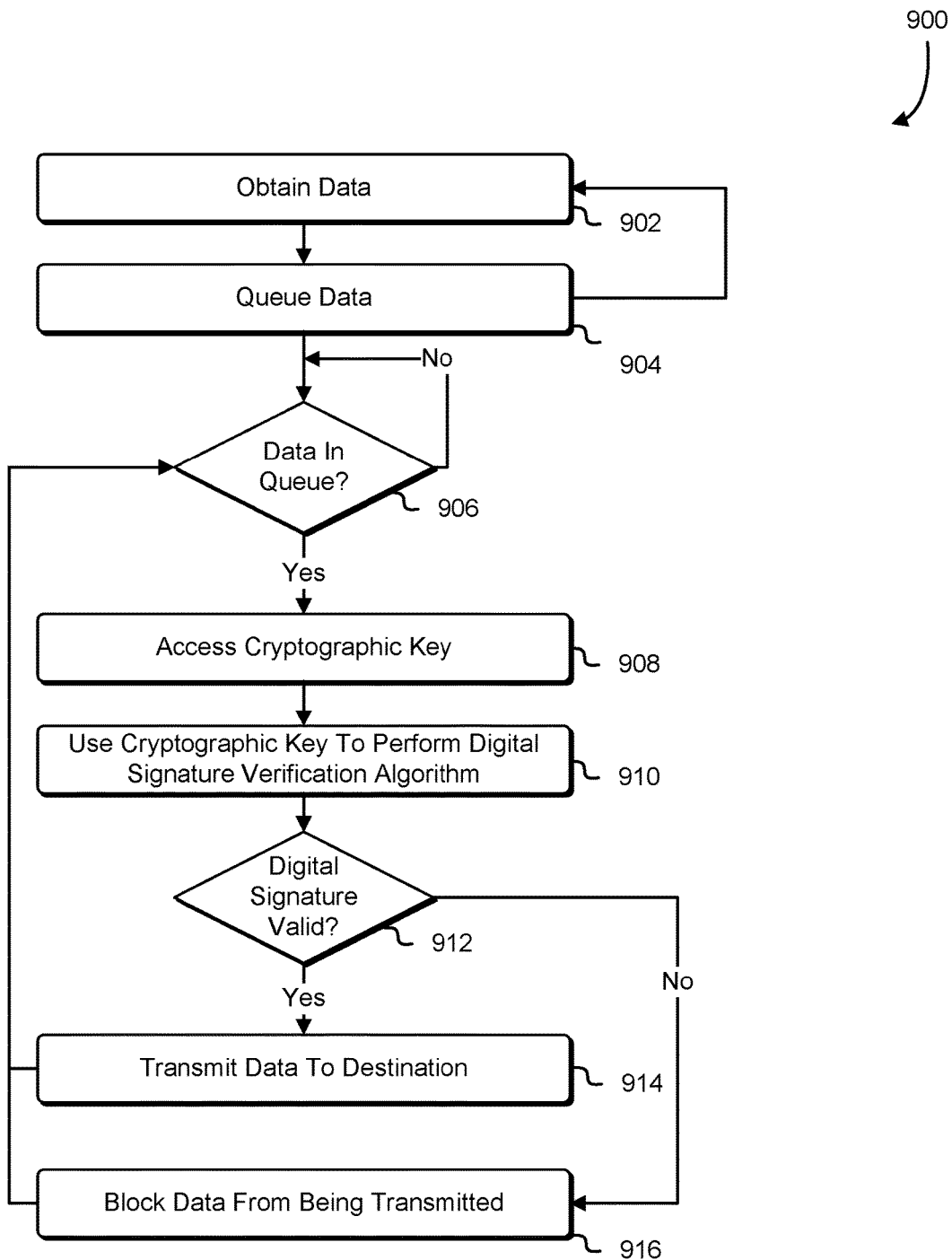
FIG. 9 shows an illustrative example of a process for enforcing one or more data loss prevention (DLP) rules in accordance with at least one embodiment.

As discussed above, a DLP enforcement component may be a network device configured to analyze network traffic for the purpose of enforcing one or more DLP rules. FIG. 9, accordingly, shows an illustrative example of a process 900 for enforcing DLP rules in accordance with various embodiments. The process 900 may be performed by any suitable system such as by a DLP enforcement component such as described above in connection with FIG. 7A. In an embodiment, the process 900 includes obtaining 902 data. The data may be, for example, encrypted data comprising a digital signature such as described above. Once obtained 902, the process 900 may include queuing 904 the data in a queue of a system performing the process 900. The queue may be monitored and accordingly the process 900 may include repeatedly determining 906 whether there is data in the queue until determined 906 that there is not data in the queue, the process 900 may continue monitoring by repeatedly determining whether there is data in the queue.

When it is determined 906 that there is data in the queue, the process 900 may include accessing 908 a cryptographic key. The cryptographic key may be accessed in various ways in accordance with various embodiments. For example, in some embodiments, the cryptographic key is accessed by obtaining the cryptographic key from volatile or nonvolatile memory depending on where the cryptographic key is stored in the system performing the process 900. The cryptographic key may be accessed 902 in other ways, such as by obtaining the cryptographic key from another system such as a key management system or other system with access to at least the cryptographic key. As noted, cryptographic keys may be associated with identifiers and the cryptographic key may be accessed utilizing an identifier of the cryptographic key to select the cryptographic key from multiple cryptographic keys (e.g., that each correspond to a different node in a network in which the system performing the process 900 is situated). In some embodiments the identifier corresponds to a system that transmitted the data that was obtained 902. Generally, any way by which the cryptographic key may be identified for access may be used.

Once the cryptographic key has been accessed 908, the cryptographic key may be used 910 to perform a digital signature verification algorithm. The digital signature verification algorithm may be an algorithm for verifying digital signatures in accordance with an algorithm utilized to generate the digital signatures. In some embodiments, signature generation and verification utilizes the elliptic curve digital signature algorithm (ECDSA), although other digital signature generation and verification algorithms may be used, including but not limited to, symmetric digital signature algorithms where the same cryptographic key is used both for signature generation and verification and other asymmetric algorithms where a different key is used to generate the signature than that used to verify the signature. Generally, any way by which a digital signature may be verified may be utilized.

Upon performance of the digital signature verification algorithm, the process 900 may include determining 912 whether the digital signature of the data obtained from the queue is valid based at least in part on a result of performing 910 the digital signature verification algorithm. If it is determined 912 that the digital signature is valid, the process 900 may include transmitting 914 the data to its destination (e.g., a network address identified in one or more data packets that contain the data). The data may be transmitted with the digital signature that was included with the data or, in some embodiments, the data is transmitted to a destination without the digital signature.

If it is determined 912 that the digital signature is invalid, the process 900 may include blocking 916 the data from being further transmitted to its destination. Blocking the data may be performed in any suitable way in accordance with various embodiments. In some examples, a system performing the process 900 simply does not transmit the data further. In some embodiments, additional operations may be performed such as transmitting one or more notifications and/or generating one or more logs of the blocked data for the purpose of forensic and/or other analysis to determine one or more reasons why data has been blocked and, if applicable, to perform one or more mitigating actions. As illustrated in FIG. 9, once the data has been transmitted 914 or blocked 916, portions of the process 900 may repeat as a queue of the system performing the process 900 is monitored and processed.

Numerous variations of the above techniques are considered as being within the scope of the present disclosure. For example, the techniques described above may be utilized to offer services to customers. A computing resource service provider, for instance, may provide compute capacity as a service, allowing customers to, through application programming interface requests, instantiate computer systems using hardware managed by the computing resource service provider. As part of such a service, customers may be able to configure isolated networks with private IP address space where the isolated networks are inaccessible to public communications networks except when allowed for by customers, such as by customers that programmatically configure network interfaces for the isolated networks. The above techniques may be used, for instance, to enable customers to instantiate computer systems, provided by the service provider, that operate in an isolated network to prevent data from leaving the isolated networks except when authorized and/or when incompliance with one or more cryptographic key usage limits. Other variations are also considered as being within the scope of the present disclosure.

Figure 10:
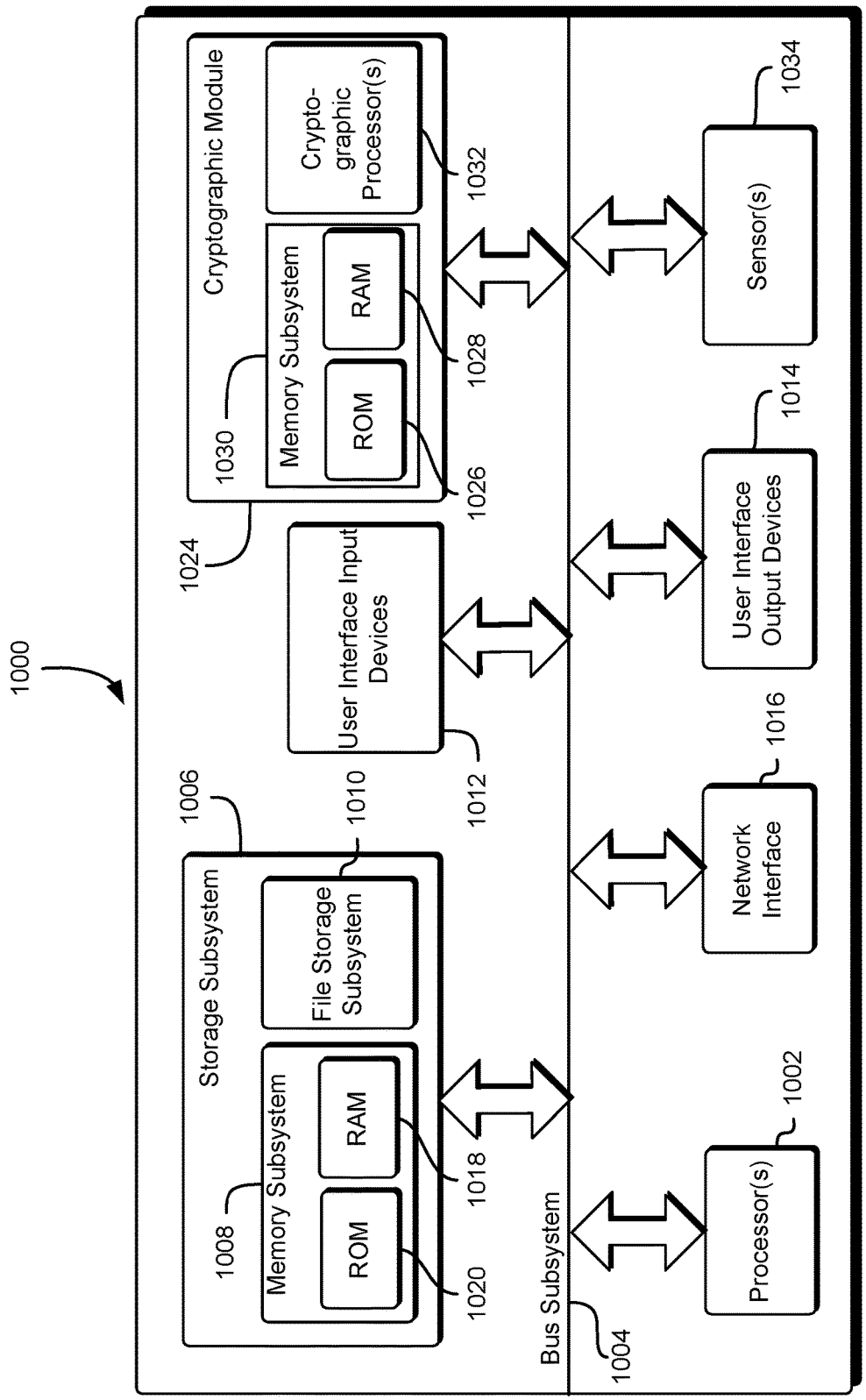
FIG. 10 Is an illustrative diagram of a computer system that may be used to implement various embodiments of the present disclosure.

FIG. 10 is an illustrative, simplified block diagram of an example device system 1000 that may be used to practice at least one embodiment of the present disclosure. In various embodiments, the device system 1000 may be used to implement any of the systems illustrated herein and described above. The device system 1000 may be, for instance, a complete computer system itself and/or component of a distributed computer system. For example, the device system 1000 may be used to implement an encryption device and/or key management system and other applications, such as a browser application, in accordance with various embodiments. As shown in FIG. 10, the device 1000 may include one or more processors 1002 that may be configured to communicate with and are operatively coupled to a number of peripheral subsystems via a bus subsystem 1004. These peripheral subsystems may include a storage subsystem 1006, comprising a memory subsystem 1008 and a file storage subsystem 1010, one or more user interface input devices 1012, one or more user interface output devices 1014, a network interface subsystem 1016, a cryptographic module 1024, comprising a memory subsystem 1030 and one or more cryptographic processors 1032. The peripheral subsystems may also include one or more sensors 1034 in addition to sensors of input devices 1012. Such sensors may include, but are not limited to, GPS sensors, accelerometers, temperature sensors and others.

The bus subsystem 1004 may provide a mechanism for enabling the various components and subsystems of device system 1000 to communicate with each other as intended. Although the bus subsystem 1004 is shown schematically as a single bus, alternative embodiments of the bus subsystem may utilize multiple busses.

The network interface subsystem 1016 may provide an interface to other device systems and networks. The network interface subsystem 1016 may serve as an interface for receiving data from and transmitting data to other systems from the device system 1000. For example, the network interface subsystem 1016 may enable transmission of communications individually and/or collectively encoding ciphertexts and other information, such as digital signatures, attestations and/or electronic requests to access a system (e.g., receive a webpage) and may enable receipt of responses to the requests, such as webpages or other information. The network interface subsystem 1016 may also facilitate the receipt and/or transmission of data on other networks, such as an organizations intranet and/or other networks described below.

The user interface input devices 1012 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials, cryptographic keys typed or otherwise input by a user, and/or other information for utilization of the various techniques described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 1000.

User interface output devices 1014, if any, may include a display subsystem, a printer or non-visual displays, such as audio and/or tactile output devices, etc. Generally, the output devices 1014 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 1000. The output device(s) 1014 may be used, for example, to present user interfaces to facilitate user interaction with applications performing processes described herein and variations therein, when such interaction may be appropriate. While a device 1000 with user interface output devices is used for the purpose of illustration, it should be noted that the device 1000 may operate without an output device, such as when the device 1000 is operated in a server rack and, during typical operation, an output device is not needed.

The storage subsystem 1006 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 1006. These application modules or instructions may be executed by the one or more processors 1002. The storage subsystem 1006 may additionally provide a repository for storing data used in accordance with the present disclosure. The storage subsystem 1006 may comprise a memory subsystem 1008 and a file/disk storage subsystem 1010.

The cryptographic module 1024, which may be a trusted platform module (TPM), includes a memory subsystem 1030, including a main random access memory (RAM) 1028 for storage of instructions and data during program execution and a read only memory (ROM) 1026, in which fixed cryptographic information may be stored, such as a hardware secret stored securely within the device 1000 so as to be non-exportable (i.e., inaccessible through any call to the cryptographic module 1024). The cryptographic module 1024, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 118810, which are incorporated herein by reference. The device 1000 may also store cryptographic keys in RAM 1028 and/or processor registers for temporary cryptographic processing. The cryptographic information stored in memory may be used in combination with cryptographic information obtained via the network interface 1016 and/or one or more of the user interface input devices 1012. The one or more cryptographic processors may be used to perform cryptographic operations in the device and may include a random number generator, SHA-2 or other hash generator and an encryption-decryption-signature engine.

The one or more cryptographic processors and/or other processors (e.g., 1002) may also be configured to individually and/or collectively perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1024 may be configured to collectively perform various operations used generating cryptographically verifiable information for attestations (e.g., assurances as noted above) and other cryptographically verifiable information.

As noted above, in various embodiments of the present disclosure, hardware secrets are securely stored within the cryptographic module 1024. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 11:
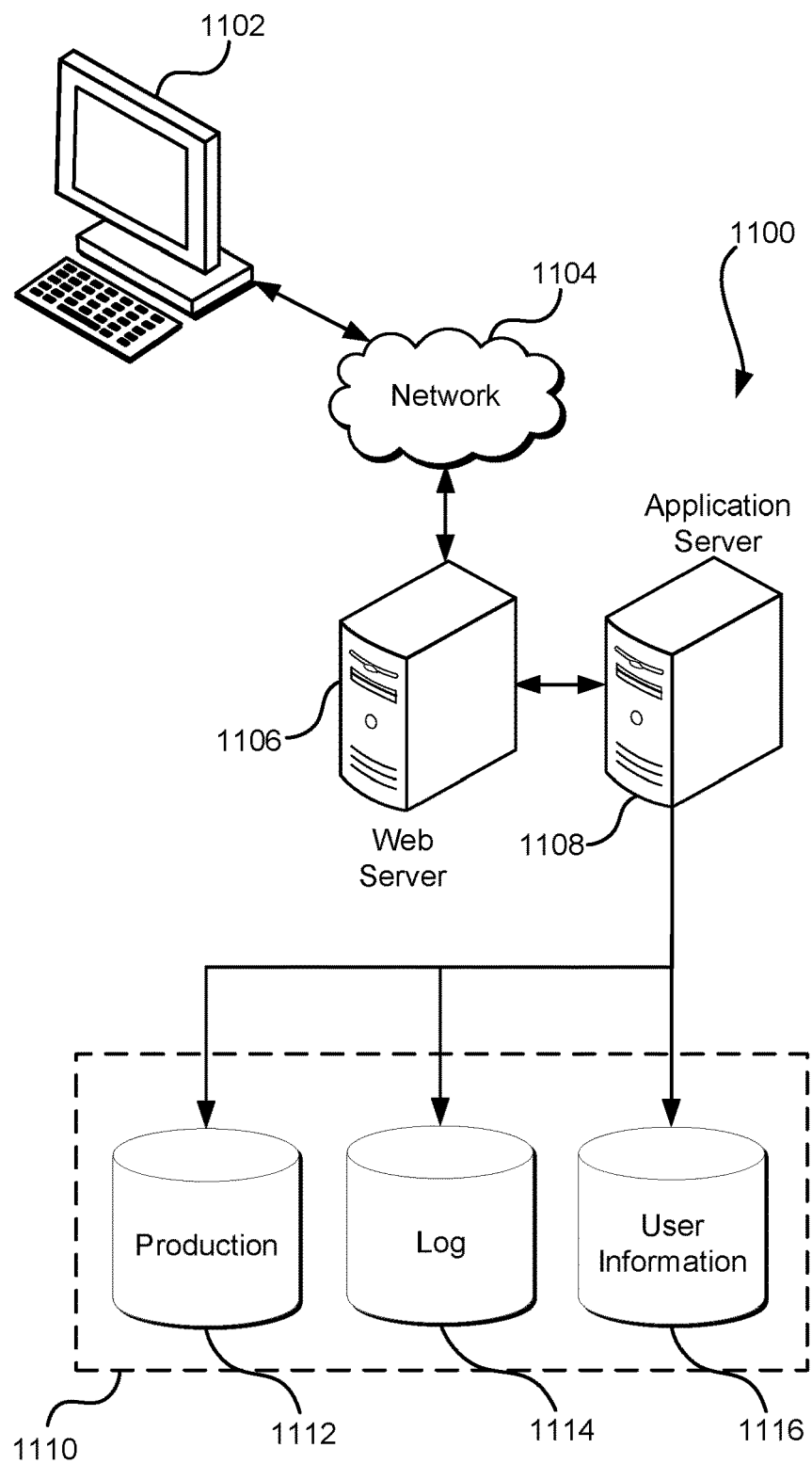
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the present disclosure can be described in view of the following clauses:

1. A computer-implemented method, comprising:
   under the control of one or more computer systems configured with executable instructions,
   causing a set of devices that have access to a first cryptographic key for cryptographic operations to replace the first cryptographic key with a second cryptographic key;
   determining an aggregated number of encryption operations performed by the set of devices using the first cryptographic key, a plurality of devices in the set contributing to the aggregated number of encryption operations;
   as a result of the determined aggregated number exceeding a usage limit for the first cryptographic key, for a set of ciphertexts encrypted under the first cryptographic key, reencrypting the set of ciphertexts under the second cryptographic key such that:
   at a time after the set of ciphertexts is re-encrypted under the second cryptographic key, individual ciphertexts of the set of ciphertexts encrypted under the first cryptographic key are unavailable; and a number of ciphertexts encrypted under the first cryptographic key that are persistently stored is below a limit corresponding to compliance with the usage limit.
2. The computer-implemented method of clause 1, wherein determining the aggregated number of encryption operations performed by the set of devices using the first cryptographic key is based at least in part on individual key usage logs generated by individual devices in the set of devices.
3. The computer-implemented method of clause 1 or 2, wherein reencrypting the set of ciphertexts includes decrypting individual ciphertexts using the first cryptographic key and encrypting the decrypted ciphertexts using the second cryptographic key.
4. The computer-implemented method of any one of the preceding clauses, wherein determining the number of encryption operations is based at least in part on metadata of a plurality of ciphertexts to identify ciphertexts generated using the first cryptographic key.
5. A system, comprising at least one computing device configured to implement one or more services, wherein the one or more services are configured to:
determine an aggregated usage amount for a first cryptographic key used by a set of devices, the aggregated usage amount based at least in part on individual usage of the first cryptographic key for performing cryptographic operations of a first type by individual devices of the set;
as a result of the determined aggregated usage amount exceeding a usage limit for the first cryptographic key, cause a one or more corrective operations to be performed on at least outputs of cryptographic operations produced in excess of the usage limit such that, after performance of the one or more corrective operations, an amount of persistently stored outputs of the cryptographic operations of the first type generated using the first cryptographic key corresponds to compliance with the usage limit.
6. The system of clause 5, wherein the cryptographic operations of the first type are encryption operations.
7. The system of clause 5 or 6, wherein the system comprises a cryptographic key management subsystem configured to cause replacement of the first cryptographic key with a second cryptographic key by the devices in the set of devices.
8. The system of clause 7, wherein the cryptographic key management subsystem is configured to coordinate the replacement of the first cryptographic key with the second cryptographic key as a result of the determined aggregated usage amount exceeding the usage limit.
9. The system of any one of clauses 5-8, wherein the aggregated usage amount is a number of cryptographic operations of the first type performed using the first cryptographic key.
10. The system of any one of clauses 5-9, wherein:
the usage limit corresponds to a limit on a number of encryption operations; and
the amount of the persistently stored output of the cryptographic operations of the first type is a number of ciphertexts encrypted under the first cryptographic key that is less than the limit on the number of encryption operations.
11. The system of any one of clauses 5-10, wherein the usage limit corresponds to an amount of time individual devices from the set of devices are limited to for utilizing the first cryptographic key to perform cryptographic operations of the first type.
12. The system of any one of clauses 5-11, further comprising a storage subsystem operable to store at least the outputs of the cryptographic operations produced in excess of the usage limit; and
the one or more corrective operations result in callers to the storage subsystem being unable to access the outputs of the cryptographic operations produced in excess of the usage limit, where the callers to the storage subsystem were able to access the outputs of the cryptographic operations before performance of the one or more corrective operations.
13. The system of clause 12, wherein the one or more corrective operations are triggered by a call to the storage subsystem to read at least one an output of a cryptographic operation performed using the cryptographic key.
14. A non-transitory computer-readable storage medium having stored thereon executable instructions that, when executed by one or more processors of a computer system, cause the computer system to at least:
detect an aggregated usage amount for a first cryptographic key used by a set of devices having exceeded a usage limit for the first cryptographic key, the aggregated usage amount based at least in part on individual usage of the first cryptographic key for performing cryptographic operations of a first type by individual devices of the set; and
as a result of the detecting the aggregated usage amount having exceeded the usage limit for the first cryptographic key, cause modification to an amount of output of the cryptographic operations of the first type that are accessible based at least in part on an amount by which the usage limit was exceeded.
15. The non-transitory computer-readable storage medium of clause 14, wherein:
the cryptographic operations of the first type are encryption operations; and
modification to the amount of output of the cryptographic operations of the first type includes re-encryption of a set of ciphertexts from the first cryptographic key to a second cryptographic key.
16. The non-transitory computer-readable storage medium of clause 14 or 15, wherein the instructions that cause the computer system to detect exceeding the usage limit, when executed by the one or more processors, cause the computer system to determine the aggregated usage amount based at least in part on logs generated by individual devices in the set of devices.
17. The non-transitory computer-readable storage medium of any one of clauses 14-16, wherein:
the usage limit is a limit on an amount of time the first cryptographic key is usable for the cryptographic operations of the first type;
the instructions that cause the computer system to cause modification to the amount of output of the cryptographic operations, when executed by the one or more processors, cause the computer system to select an interval of time based at least in part on an amount of output of the cryptographic operations generated during the interval; and
modification to the amount of output of the cryptographic operations includes modification to the output of the cryptographic operations generated during the selected interval of time.

18. The non-transitory computer-readable storage medium of any one of clauses 14-17, wherein the usage limit is based at least in part on a number of ciphertexts generated collectively by the set of devices using the first cryptographic key.

19. The non-transitory computer-readable storage medium of any one of clauses 14-18, wherein the amount of output of the cryptographic operations includes output of one or more cryptographic operations of the first type performed during a process of rotating the first cryptographic key.

20. The non-transitory computer-readable storage medium of any one of clauses 14-19, wherein the instructions further include instructions that, when executed by the one or more processors, cause the computer system to determine the aggregated usage amount by querying an index that associates ciphertexts with respective cryptographic keys used to generate the ciphertexts.

21. A system, comprising a set of computing devices configured to implement at least:

a ciphertext-emitting subsystem configured to:

perform operations involving ciphertexts in compliance with one or more policies constraining use of a cryptographic key;

generate a digital signature of a ciphertext; and transmit, in a request to store the data in a data storage system, the ciphertext and the digital signature to a network destination corresponding to the data storage system, wherein the ciphertext and the request were produced in compliance with the one or more policies constraining use of the cryptographic key; and a data guardian subsystem configured to:

obtain the transmitted ciphertext and digital signature;

verify the digital signature; and enable the ciphertext to be received at the network destination on a condition that the digital signature is verified as valid.

22. The system of clause 21, wherein:

the ciphertext-emitting subsystem is further configured to obtain a cryptographically verifiable attestation to a state of the ciphertext-emitting subsystem; and the data guardian subsystem is configured to transmit the ciphertext further contingent on performing a cryptographic verification of the cryptographically verifiable attestation.

23. The system of clause 22 or 22, wherein the ciphertext-emitting subsystem comprises a trusted platform module that generates the cryptographically verifiable attestation.

24. The system of any one of clauses 21-23, wherein the one or more policies constraining use of the cryptographic key include a policy limiting a number of ciphertexts generated using the cryptographic key.

25. The system of any one of clauses 21-24, further comprising a data storage subsystem corresponding to the network destination and operable to store the ciphertext when received after the data guardian subsystem enables the ciphertext to be received at the network destination.

26. A computer-implemented method, comprising:

intercepting, at a first network destination, one or more transmissions comprising a data record and addressed to a second network destination;

determining that the data record is encrypted;

as a result of determining that the data record is encrypted, determining whether to block the one or more transmissions, wherein determining whether to includes:

determining whether the one or more transmissions include an attestation indicating an authorized state of a system providing the data record and including a valid digital signature generated by the system providing the data record, where the system is operable to enforce a usage limit on a cryptographic key; and transmitting at least the data record to the second network destination contingent on not determining to block the one or more transmissions.

27. The computer-implemented method of clause 26, further comprising intercepting, at the first network destination, one or more second transmissions comprising a second data record that is encrypted, the one or more second transmissions lacking at least one of a valid digital signature or a valid attestation and, as a result, blocking the one or more second transmissions.

28. The computer-implemented method of clause 26 or 27, wherein the one or more communications encode a request to store the encrypted data record in a data storage system corresponding to the second network destination.

29. The computer-implemented method of any one of clauses 26-28, wherein the usage limit on the cryptographic key is a limit on a number of ciphertexts generated using the cryptographic key that are provided from the computer system.

30. The computer-implemented method of any one of clauses 26-29, wherein the first network destination is different from a network location from which the one or more transmissions were received.

31. The computer-implemented method of any one of clauses 26-30, wherein:

a system that originated the one or more transmissions corresponds to a third network address; and the second network address and first network address are on a private network.

32. The computer-implemented method of clause 31, wherein the second network address is outside of the private network.

33. The computer-implemented method of any one of clauses 26-32, wherein the method further comprises:

intercepting, at the first network destination, one or more second transmissions comprising a second data record and addressed to the second network destination or a third network destination;

determining that the second data record is unencrypted; and allowing the one or more transmissions to continue to the second network destination or the third network destination as a result of determining that the second data record is unencrypted.

34. A non-transitory computer-readable storage medium having stored thereon executable instructions that, when executed by one or more processors of a computer system, cause the computer system to at least:

enforce one or more policies that constrain use of a first cryptographic key;

obtain an encrypted data record, the encrypted data record generated based at least in part on the cryptographic key and associated with a data storage system that stores data records;

generate, based at least in part on a second cryptographic key and the encrypted data record, a digital signature of at least the encrypted data record; and transmit the encrypted data record and the generated digital signature to a network destination such that, en route to the network destination, the obtained encrypted data record and the generated digital signature pass through an enforcement component configured to allow at least the encrypted data record to continue to the network destination contingent on the digital signature being valid.

35. The non-transitory computer-readable storage medium of clause 34, wherein the instructions that cause the computer system to obtain the encrypted data record, when executed by the one or more processors, cause the computer system to obtain a plaintext data record and use the first cryptographic key to encrypt the plaintext data record, thereby generating the encrypted data record.

36. The non-transitory computer-readable storage medium of clause 34 or 35, wherein the instructions further comprise instructions that, when executed by the one or more processors, cause the computer system to:

obtain a cryptographic hash generated based at least in part on at least a subset of the executable instructions whose execution by the one or more processors causes the computer system to enforce the one or more policies that constrain use of the first cryptographic key; and transmit the obtained cryptographic hash with the result of the cryptographic operation.

37. The non-transitory computer-readable storage medium of any one of clauses 34-36-, wherein the cryptographic hash is from a platform configuration register of a trusted platform module of the computer system.

38. The non-transitory computer-readable storage medium of any one of clauses 34-37, wherein the one or more policies that constrain use of the first cryptographic key constrain a number of ciphertexts generated using the first cryptographic key.

39. The non-transitory computer-readable storage medium of any one of clauses 34-38, wherein the network destination corresponds to the data storage system.

40. The non-transitory computer-readable storage medium of any one of clauses 34-39, wherein the instructions that cause the computer system to obtain the encrypted data record, when executed by the one or more processors, cause the computer system to receive the encrypted data record from another computer system.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
identifying one or more parameters associated with data, the data indicated in a request for delivery to a network destination, the one or more parameters indicative of the data being encrypted using a cryptographic key subject to a policy, the policy defining a usage limit on the cryptographic key;
processing the data to determine the data was encrypted using the cryptographic key outside of the usage limit;
preventing, in response to determining that the data was encrypted using the cryptographic key outside of the usage limit, the data from reaching the network destination;
re-encrypting the data using a different cryptographic key in compliance with the policy, thereby generating re-encrypted data; and
transmitting the re-encrypted data to the network destination.

2. The computer-implemented method of claim 1, wherein the usage limit is based at least in part on a time of validity for the cryptographic key.

3. The computer-implemented method of claim 1, wherein the data is identified as a result of receiving a trigger associated with enforcing the policy.

4. The computer-implemented method of claim 1, wherein the network destination is on a different network than a source sending the data to the network destination.

5. The computer-implemented method of claim 1, wherein identifying the data includes intercepting the data prior to the data reaching the network destination.

6. The computer-implemented method of claim 1, wherein the different cryptographic key is a symmetric cryptographic key.

7. The computer-implemented method of claim 1, wherein:
the method further comprises obtaining a second request to re-encrypt the data; and
the data is re-encrypted in response to the obtaining of the second request.

8. The computer-implemented method of claim 1, wherein the cryptographic key is persisted in data storage.

9. A system, comprising:
one or more processors; and
memory including instructions that, as a result of execution by the one or more processors, cause the system to:
identify a data transmission encrypted using a cryptographic key subject to a policy that defines a usage limit on the cryptographic key;
process, by determining validity of an attestation of a system state attributable to the cryptographic key, the data to determine that the data transmission was encrypted using the cryptographic key in violation of the policy, wherein the system state is associated with a computing environment that generates the cryptographic key; and
block, as a result of the violation of the policy, the data transmission from reaching a network destination.

10. The system of claim 9, wherein the one or more services process the data by determining validity of a digital signature associated with the cryptographic key.

11. The system of claim 10, wherein the data transmission includes the digital signature.

12. The system of claim 10, wherein the one or more services further process the digital signature to determine that the cryptographic key was used after the usage limit was fulfilled.

13. The system of claim 9, wherein the instructions further include instructions that, as a result of execution by the one or more processors of a computer system, further cause the computer system to re-encrypt the data transmission with a current cryptographic key.

14. A non-transitory computer-readable storage medium comprising executable instructions that, as a result of execution by one or more processors of a computer system, cause the computer system to at least:
enforce a policy that defines a usage limit on a cryptographic key, wherein the usage limit is associated with a rotation schedule, by at least:
identifying one or more markers associated with a data transmission indicative of the data transmission being encrypted using the cryptographic key;
processing the data to determine that the data transmission was encrypted using the cryptographic key in violation of the policy; and
preventing, as a result of the violation of the policy, the data transmission from reaching a network destination.

15. The non-transitory computer-readable storage medium of claim 14, wherein the instructions, as a result of execution, further cause the computer system to detect that the data transmission is intended for the network destination.

16. The non-transitory computer-readable storage medium of claim 14, wherein the computer system generates the cryptographic key.

17. The non-transitory computer-readable storage medium of claim 14, wherein the instructions, as a result of execution, further cause the computer system to identify the data transmission at an edge of a network to which the network destination is associated.

18. The non-transitory computer-readable storage medium of claim 17, wherein the data transmission is from a different network than the network.

19. The non-transitory computer-readable storage medium of claim 14, wherein the instructions, as a result of execution, further cause the computer system to allow unencrypted data to reach the network destination.

20. The non-transitory computer-readable storage medium of claim 14, wherein the rotation schedule is associated with a clock-based trigger.

* * * * *